(12) United States Patent
Chen et al.

(10) Patent No.: US 10,771,204 B2
(45) Date of Patent: Sep. 8, 2020

(54) HALF-DUPLEX OPERATION IN NEW RADIO SYSTEMS

(71) Applicant: QUALCOMM Incorporated, San Diego, CA (US)

(72) Inventors: Wanshi Chen, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/275,056

(22) Filed: Feb. 13, 2019

(65) Prior Publication Data

US 2019/0215112 A1    Jul. 11, 2019

Related U.S. Application Data

(63) Continuation of application No. 15/711,143, filed on Sep. 21, 2017, now Pat. No. 10,211,955.

(Continued)

(51) Int. Cl.
*H04K 1/10* (2006.01)
*H04L 27/28* (2006.01)
(Continued)

(52) U.S. Cl.
CPC ............ *H04L 5/0012* (2013.01); *H04L 5/001* (2013.01); *H04L 5/0007* (2013.01);
(Continued)

(58) Field of Classification Search
CPC ....... H04L 5/0012; H04L 5/023; H04L 5/001; H04L 5/0051; H04L 5/0091;
(Continued)

(56) References Cited

U.S. PATENT DOCUMENTS 9,319,188 B2  4/2016 Yin et al.
9,402,257 B2  7/2016 Montojo et al.
(Continued)

OTHER PUBLICATIONS

Ericsson: "MAC Impacts of Different Numerologies and Flexible TTI Duration", 3GPP Draft; R2-166817—MAC Impacts of Different Numerologies and Flexible TTI Duration, 3rd Generation Partnership Project (3GPP), Mobile Competence Centre, 650, Route Des Lucioles, F-06921 Sophia-Antipolis Cedex, France, vol. RAN WG2, No. Kaohsiung, Taiwan; 20161010-20161014 Oct. 9, 2016, XP051151269, Retrieved from the Internet: URL:http://www.3gpp.org/ftp/Meetings_3GPP_SYNC/RAN2/Docs/ [retrieved on Oct. 9, 2016], 3 pages.

(Continued)

*Primary Examiner* — Phuong Phu
(74) *Attorney, Agent, or Firm* — Holland & Hart LLP

(57) ABSTRACT

Methods, systems, and devices for wireless communication are described. A base station may communicate with a user equipment (UE) using frequency resources (e.g., subcarriers) with scalable channel spacing and time resources (e.g., slots) with variable slot durations. The individual slots may include multiple symbols, and each symbol may be allocated for communication in a specific link direction (e.g., uplink, downlink, or sidelink). For UEs configured to operate in a half-duplex mode, the base station may allocate sufficient time for the UE to transition between uplink and downlink configurations. In other cases, for carrier aggregation, the base station may coordinate with the UE to prevent conflicting communications (e.g., simultaneous uplink and downlink transmissions). UEs or other devices may communicate directly with one another in a device-to-device configuration using the same or a similar scheme to allow for half-duplex devices to transition between sending and receiving.

30 Claims, 28 Drawing Sheets

Related U.S. Application Data

(60) Provisional application No. 62/453,946, filed on Feb. 2, 2017.

(51) Int. Cl.
    *H04L 5/00*     (2006.01)
    *H04W 72/04*     (2009.01)
    *H04L 5/16*     (2006.01)
    *H04L 5/02*     (2006.01)
    *H04L 5/14*     (2006.01)

(52) U.S. Cl.
    CPC .............. *H04L 5/0091* (2013.01); *H04L 5/16* (2013.01); *H04W 72/0446* (2013.01); *H04L 5/0028* (2013.01); *H04L 5/023* (2013.01); *H04L 5/14* (2013.01); *H04W 72/0453* (2013.01)

(58) Field of Classification Search
    CPC ......... H04L 5/0007; H04L 5/16; H04L 5/028; H04L 5/14; H04W 72/0453; H04W 48/10
    USPC .......................................... 375/260; 370/335
    See application file for complete search history.

(56) References Cited

U.S. PATENT DOCUMENTS

| | | |
|---|---|---|
| 9,480,036 B2 | 10/2016 | Blankenship et al. |
| 1,021,195 A1 | 2/2019 | Chen et al. |
| 2007/0041347 A1* | 2/2007 | Beale .................... H04W 48/10 370/335 |
| 2016/0183308 A1 | 6/2016 | Eriksson et al. |
| 2016/0219583 A1 | 7/2016 | Blankenship |
| 2017/0303144 A1 | 10/2017 | Guo et al. |

OTHER PUBLICATIONS

International Search Report and Written Opinion—PCT/US2018/016448—ISA/EPO—May 5, 2018.

ETRI: "Discussion on Numerology Multiplexing in NR", 3GPP Draft; R1-166940 Discussion on Numerology Multiplexing in NR, 3rd Generation Partnership Project (3GPP), Mobile Competence Centre; 650, Route Des Lucioles; F-06921 Sophia-Antipolis Cedex ; France, vol. RAN WG1, No. Gothenburg, Sweden; 20160822-20160826, Aug. 21, 2016 (Aug. 21, 2016), pp. 1-4, XP051140445, Retrieved from the Internet: URL: http://www.3gpp.org/ftp/Meetings_3GPP_SYNC/RAN1/Docs/ [retrieved on Aug. 21, 2016].

* cited by examiner

HALF-DUPLEX OPERATION IN NEW RADIO SYSTEMS

CROSS REFERENCES

The present Application for Patent is a Continuation of U.S. patent application Ser. No. 15/711,143 by CHEN et al., entitled "HALF-DUPLEX OPERATION IN NEW RADIO SYSTEMS," filed Sep. 21, 2017, which claims priority to U.S. Provisional Patent Application No. 62/453,946 by CHEN, et al., entitled "HALF-DUPLEX OPERATION IN NEW RADIO SYSTEMS," filed Feb. 2, 2017, assigned to the assignee hereof.

BACKGROUND

The following relates generally to wireless communication and more specifically to half-duplex operation in New Radio (NR) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a NR system).

A wireless multiple-access communications system may include a number of base stations or access network nodes, each simultaneously supporting communication for multiple communication devices, which may be otherwise known as user equipment (UE). A base station may communicate with a UE using frequency resources (e.g., subcarriers) with scalable channel spacing (e.g., 15 kHz, 30 kHz, etc.) and time resources (e.g., slots) with variable durations (e.g., 0.5 ms, 0.25 ms, etc.). In such cases, the timing of uplink transmissions and downlink transmissions may conflict, and it may be challenging for some UEs (e.g., half-duplex UEs) to utilize resources efficiently. As a result, a wireless communications system may experience reduced throughput.

SUMMARY

Some wireless communications systems (e.g., New Radio (NR) systems) may support communication using time and frequency resources with different numerologies. For example, a base station may communicate with a user equipment (UE) using frequency resources (e.g., subcarriers) with scalable channel spacing and time resources (e.g., slots) with variable durations. A slot may include multiple symbols, and each symbol may be allocated for communication in a specific link direction (e.g., uplink, downlink, or sidelink).

For UEs configured to operate in a half-duplex mode, the base station may allocate sufficient time for the UE (or components of a UE) to transition between an uplink configuration and a downlink configuration. For example, a base station may coordinate with a UE to adjust the timing of transmissions, or the base station may allocate specific symbols to provide sufficient time for the UE to transition between configurations. In other cases, the UE may be scheduled for bidirectional communication on multiple carriers using carrier aggregation. In such cases, the base station may coordinate with the UE to avoid conflicting transmissions (i.e., simultaneous uplink and downlink transmissions). UEs or other devices may communicate directly with one another in a device-to-device configuration using the same or a similar scheme to allow half-duplex devices to transition between sending and receiving.

A method for wireless communication at a first wireless device is described. The method may include transmitting or receiving, to or from a second wireless device, signaling that indicates a carrier aggregation configuration including a first carrier and a second carrier, where a numerology or slot duration of the first carrier is different from a numerology or slot duration of the second carrier, identifying a symbol period designated for communication in a first link direction on resources of the first carrier and designated for communication in a second link direction on resources of the second carrier, and communicating on resources of the first carrier or the second carrier during the symbol period based at least in part on a capability of the first or second wireless device.

An apparatus for wireless communication at a first wireless device is described. The apparatus may include means for transmitting or receiving, to or from a second wireless device, signaling that indicates a carrier aggregation configuration including a first carrier and a second carrier, where a numerology or slot duration of the first carrier is different from a numerology or slot duration of the second carrier, means for identifying a symbol period designated for communication in a first link direction on resources of the first carrier and designated for communication in a second link direction on resources of the second carrier, and means for communicating on resources of the first carrier or the second carrier during the symbol period based at least in part on a capability of the first or second wireless device.

Another apparatus for wireless communication at a first wireless device is described. The apparatus may include a processor, memory in electronic communication with the processor, and instructions stored in the memory. The instructions may be operable to cause the processor to transmit or receive, to or from a second wireless device, signaling that indicates a carrier aggregation configuration including a first carrier and a second carrier, where a numerology or slot duration of the first carrier is different from a numerology or slot duration of the second carrier, identify a symbol period designated for communication in a first link direction on resources of the first carrier and designated for communication in a second link direction on resources of the second carrier, and communicate on resources of the first carrier or the second carrier during the symbol period based at least in part on a capability of the first or second wireless device.

A non-transitory computer readable medium for wireless communication at a first wireless device is described. The non-transitory computer-readable medium may include instructions operable to cause a processor to transmit or receive, to or from a second wireless device, signaling that indicates a carrier aggregation configuration including a first carrier and a second carrier, where a numerology or slot duration of the first carrier is different from a numerology or slot duration of the second carrier, identify a symbol period designated for communication in a first link direction on resources of the first carrier and designated for communication in a second link direction on resources of the second carrier, and communicate on resources of the first carrier or the second carrier during the symbol period based at least in part on a capability of the first or second wireless device.

In some examples of the method, apparatus, and non-transitory computer-readable medium described above, the first link direction includes one of a downlink, an uplink, or a sidelink, and the second link direction includes one of a downlink, an uplink or a sidelink, and may be different from the first link direction. In some examples of the method, apparatus, and non-transitory computer-readable medium described above, the first wireless device operates in a half-duplex mode, and communicating on resources of the first carrier or the second carrier during the symbol period includes communicating on resources of the first carrier or the second carrier during the symbol period based at least in part on the capability of the first wireless device.

In some examples of the method, apparatus, and non-transitory computer-readable medium described above, the first wireless device includes a UE and the second wireless device includes a base station. In some examples of the method, apparatus, and non-transitory computer-readable medium described above, the first wireless device includes a base station and the second wireless device includes a UE. Some examples of the method, apparatus, and non-transitory computer-readable medium described above may further include processes, features, means, or instructions for refraining from communicating on resources of the first carrier or the second carrier during the symbol period.

In some examples of the method, apparatus, and non-transitory computer-readable medium described above, communicating on resources of the first carrier or the second carrier during the symbol period includes communicating on resources of the first carrier or the second carrier during the symbol period based at least in part on a cell identity of the first carrier or the second carrier. In some examples of the method, apparatus, and non-transitory computer-readable medium described above, the cell identity indicates at least one of a primary cell (PCell), primary secondary cell (PS-Cell), or a secondary cell (SCell).

In some examples of the method, apparatus, and non-transitory computer-readable medium described above, communicating on resources of the first carrier or the second carrier during the symbol period includes communicating on resources of the first carrier or the second carrier during the symbol period based at least in part on a configuration of at least one of the first carrier and the second carrier. In some examples of the method, apparatus, and non-transitory computer-readable medium described above, the first carrier and the second carrier may be within a same frequency band.

DETAILED DESCRIPTION

Figure 1:
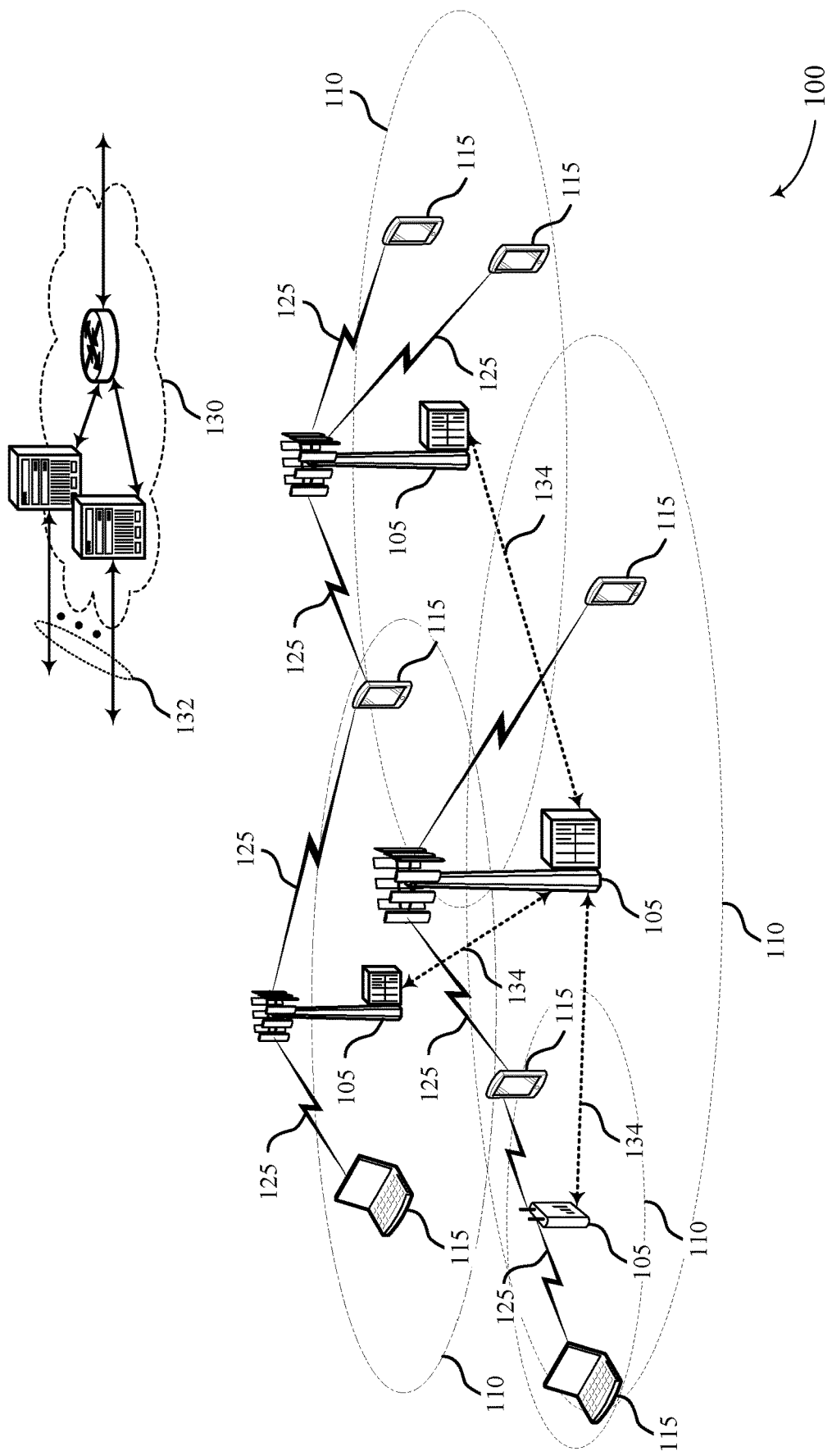
FIG. 1 illustrates an example of a wireless communications system that supports half-duplex operation in New Radio (NR) systems in accordance with various aspects of the present disclosure.

As the demand for wireless data increases, the efficient use of resources becomes increasingly important. Accordingly, a wireless communications system (e.g., a New Radio (NR) system) may support the use of time and frequency resources with varying numerology (e.g., different subcarrier spacing and slot durations) to support more flexible allocation of resources. Efficient techniques for communicating using the different variations of time and frequency resources may be desirable to improve throughput in a wireless communications system. Specifically, a system may support communication with half-duplex operation using efficient techniques for transitioning between uplink and downlink configurations and for communicating over multiple carriers.

In some cases, a base station may allocate resources for uplink communication and downlink communication with a user equipment (UE). The base station may designate specific symbol periods for uplink communication and specific symbol periods for downlink communication. In some examples, the UE may be scheduled (or required) to transmit uplink signals during a symbol period and receive downlink signals during a subsequent symbol period. However, the UE may not have sufficient time to transition from an uplink configuration to a downlink configuration due to its radio frequency (RF) capabilities, etc. As such, the UE may not be able to receive some or all of the downlink information in the subsequent symbol (or, in other cases, the UE may not be able to make full use of a symbol (or symbols) for uplink communication), which may result in reduced throughput in a wireless communications system.

In other cases, a UE may be configured for carrier aggregation, and the UE may communicate using multiple carriers to increase bandwidth and throughput. The UE may be scheduled for an uplink transmission during a symbol period on resources of a carrier, and the UE may also be scheduled for a downlink transmission during the same symbol period on resources of a different carrier. However, the UE may not be capable of transmitting and receiving signals simultaneously. Thus, such scheduling may result in reduced throughput in a wireless communications system.

As described herein, a wireless communications system may support techniques for improving the timing of uplink and downlink communication and avoiding conflicting transmissions to improve throughput. In some examples, a base station may schedule sufficient time or set a timing advance for a UE to transition from an uplink configuration to a downlink configuration or vice versa based on a numerology of the resources allocated for uplink and downlink transmissions. In other examples, for carrier aggregation, a base station may coordinate with a UE to ensure that uplink transmissions scheduled during a specific symbol period on resources of a carrier do not interfere with downlink transmissions scheduled during the same symbol period on resources of another carrier.

Aspects of the disclosure introduced above are described below in the context of a wireless communications system. Examples of processes and signaling exchanges that support half-duplex operation in NR systems are then described. Aspects of the disclosure are further illustrated by and described with reference to apparatus diagrams, system diagrams, and flowcharts that relate to half-duplex operation in NR systems.

FIG. 1 illustrates an example of a wireless communications system 100 that supports half-duplex operation in NR systems in accordance with various aspects of the present disclosure. The wireless communications system 100 includes base stations 105, UEs 115, and a core network 130. In some examples, the wireless communications system 100 may be a Long Term Evolution (LTE) (or LTE-Advanced (LTE-A)) network, or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, an automobile component, a train, a train component, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115 or may operate under the control of a base station controller (not shown). In some examples, base stations 105 may be macro cells, small cells, hot spots, or the like. Base stations 105 may also be referred to as eNodeBs (eNBs) 105 or, in some cases, nodes.

The core network 130 may provide user authentication, access authorization, tracking, Internet Protocol (IP) connectivity, and other access, routing, or mobility functions. At least some of the network devices, such as base stations 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, a UE 115 may be able to communicate directly with other UEs (e.g., using a peer-to-peer (P2P) or device-to-device (D2D) protocol) over a sidelink connection. One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, an MTC or IoT device may operate using half-duplex (one-way) communications at a reduced peak rate. The MTC or IoT device may support the use of guard periods (e.g., in units of symbols or subframes) and collision handling (e.g., for two adjacent transmissions in different directions and/or different sub-bands) to facilitate switching between uplink and downlink configurations and radio frequency retuning from one sub-band to another.

In some cases, UEs 115 and base stations 105 may support retransmissions of data to increase the chances that data is received successfully. Hybrid automatic repeat request (HARQ) feedback is one technique of increasing the likelihood that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot.

Time intervals in LTE or NR may be expressed in multiples of a basic time unit (which may be a sampling period of $T_s=1/30,720,000$ seconds). Time resources may be organized according to radio frames of length 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). In some examples, the basic time unit is a slot. In some examples, the basic time unit is of shorter duration— e.g., one or more modulation symbol periods each having a duration of $\frac{1}{14}$ of 1 ms. Excluding the cyclic prefix, each symbol may contain 2048 sample periods. Other symbol durations may also be employed.

In some cases, the subframe or slot may be the smallest scheduling unit, and may be referred to as a TTI. In other cases, a TTI may be shorter than a subframe or may be dynamically selected (e.g., in short TTI bursts or in selected component carriers using short TTIs). Timing between slots or within slots may be adjusted to account for half-duplex operation as described herein.

A resource element may consist of one symbol period and one subcarrier (e.g., a 15 KHz frequency range). In some cases, the numerology employed within a system (i.e., symbol size, subcarrier size, symbol-period duration, and/or TTI duration) may be selected or determined based on a type of communication. The numerology may be selected or determined in view of an inherent tradeoff between latency for low latency applications and efficiency for other applications, for example. In some cases, a resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. Resource blocks may be defined according to other numerologies in various examples.

Wireless communications system 100 may support operation on multiple cells or carriers, a feature which may be referred to as carrier aggregation or multi-carrier operation. A carrier may also be referred to as a component carrier, a layer, a channel, etc. The terms "carrier," "component carrier," "cell," and "channel" may be used interchangeably herein. A component carrier may be a primary cell (PCell), a secondary cell (SCell), or a primary SCell (PSCell). Both the PCell and SCell may be used to support communication with a UE 115. However, the PCell may be used to maintain a radio resource control (RRC) connection with the UE 115. In some cases, a UE 115 may be configured with multiple downlink component carriers and one or more uplink component carriers for carrier aggregation. Multiple base stations 105 (or cells) may communicate with a UE 115 in a dual connectivity configuration in which component carriers are aggregated. In some cases, a node (or some other network device) may transmit signaling to a UE 115 to configure the UE 115 for carrier aggregation.

In some cases, wireless communications system 100 may utilize enhanced component carriers (eCCs). An eCC may be characterized by one or more features including wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other CCs. For example, an eCC may utilize a reduced symbol duration as compared with symbol durations of the other CCs. A shorter symbol duration may be associated with increased subcarrier spacing.

A base station 105 or UE 115 may transmit bidirectional signals using frequency division duplexing (FDD) (e.g., using paired spectrum resources) or time division duplexing (TDD) (e.g., using unpaired spectrum resources). In some cases, specific frame structures for FDD (e.g., frame structure type 1) and TDD (e.g., frame structure type 2) may be defined. For TDD frame structures, each subframe may carry uplink or downlink signals, and special subframes may be used to switch between downlink and uplink configurations. Special subframes may carry downlink or uplink traffic and may include a guard period (GP) between downlink and uplink signals. In some examples, the time used to switch between an uplink and downlink configuration may differ for different categories of UEs 115 (e.g., half-duplex UEs 115). For example, a type 0 half-duplex UE 115 may be capable of transitioning between an uplink and downlink configuration faster (e.g., <20 μs) than a type 1 half-duplex UE 115 (e.g., >200 μs). In some cases, a UE 115 may signal its capability or type to a base station 105 for the base station 105 to use for scheduling communication with the UE 115.

As discussed above, wireless communications system 100 may support the use of frequency resources with scalable carrier spacing (e.g., 15 kHz, 30 kHz, etc.) and variable slot durations (e.g., 0.5 μs, 0.25 μs, etc.). In some cases, the duration of guard periods allocated for transitioning between an uplink configuration and a downlink configuration may not be sufficient. In such cases, a wireless device (e.g., a half-duplex UE 115) may not be able to transition in time for a specific transmission, which may result in reduced throughput in a wireless communications system. Additionally, a wireless device may be configured for carrier aggregation, and the device may be scheduled for uplink communication on one carrier and downlink communication on another carrier during the same symbol period. However, some wireless devices (e.g., half-duplex UEs 115) may not support simultaneous bidirectional communication, and such scheduling may result in reduced throughput in a wireless communications system.

Wireless communications system 100 may support efficient techniques for communicating on time and frequency resources with various numerologies to improve throughput. For example, a base station 105 may allocate sufficient time for a UE 115 to transition from an uplink configuration to a downlink configuration and vice versa. In some cases, a base station 105 may coordinate with a UE 115 to adjust the timing of uplink transmissions or downlink transmissions to increase the duration of a transition period. In other cases, a base station 105 may allocate sufficient time for a UE 115 to transition between an uplink and downlink configuration. In addition, for a UE 115 utilizing carrier aggregation, a base station 105 may coordinate with the UE 115 to avoid scheduling the UE 115 for simultaneous bidirectional communication. However, in such cases where a UE 115 is scheduled for simultaneous uplink and downlink communication on resources of different carriers, the UE 115 may refrain from communicating on resources of one of the carriers based on, for example, a priority associated with each carrier.

Figure 2:
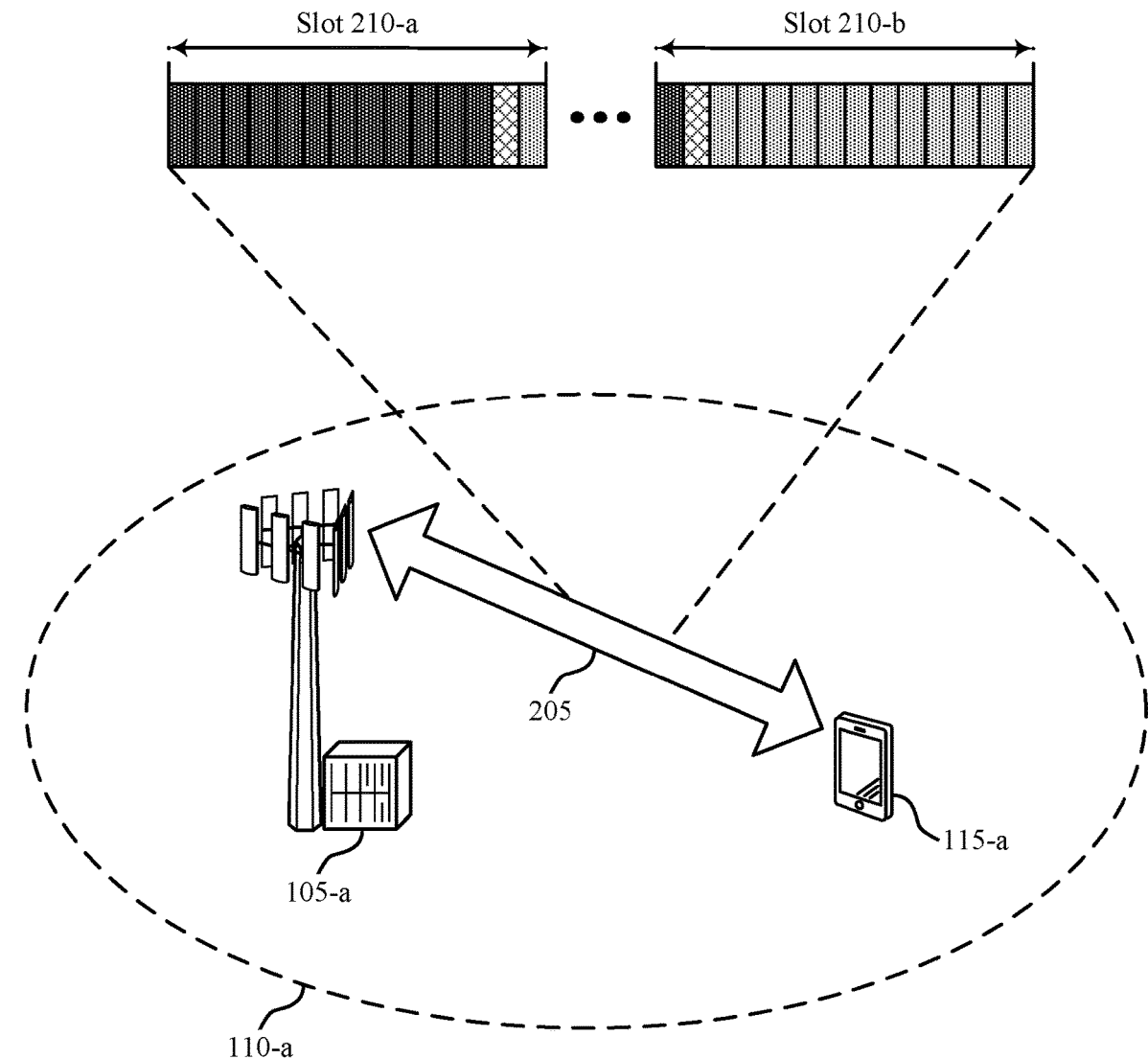
FIG. 2 illustrates an example of a wireless communications system that supports half-duplex operation in NR systems in accordance with various aspects of the present disclosure.
Figure 2:
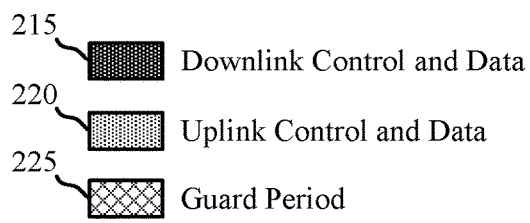

FIG. 2 illustrates an example of a wireless communications system 200 that supports half-duplex operation in NR systems in accordance with various aspects of the present disclosure. Wireless communications system 200 includes base station 105-a and UE 115-a, which may be examples of a base station 105 and a UE 115 described with reference to FIG. 1. Base station 105-a may provide communication coverage for coverage area 110-a. Base station 105-a may communicate with UE 115-a on resources of one or more carriers 205 using TDD or FDD. In some cases, base station 105-a and UE 115-a may communicate during slots 210 (e.g., self-contained slots). Slots 210 may include symbol periods allocated for downlink control and data 215, uplink control and data 220, and guard periods 225. Slot 210-a may be an example of a downlink centric slot in an NR system, and slot 210-b may be an example of an uplink centric slot in an NR system.

In some cases, UE 115-a may be an example of a half-duplex UE 115. Accordingly, UE 115-a may be restricted to communicating in a single direction (e.g., uplink or downlink) at a specific time instant. For communication using TDD or FDD, UE 115-a may utilize a guard period (or some other transition period) to transition between uplink and downlink configurations. However, in some cases, the duration of the guard period (or some other transition period) may not be sufficient for transitioning between an uplink and downlink configuration (e.g., within a slot or across slots). As described with reference to FIG. 1, if UE 115-a is not allocated sufficient time for transitioning between an uplink and downlink configuration, wireless communications system 200 may experience reduced throughput.

Wireless communications system 200 may support efficient techniques for allocating sufficient time for UE 115-a to transition between uplink and downlink configurations. In some examples, base station 105-a or UE 115-a may communicate based on a timing advance. For example, UE 115-a may transmit uplink signals earlier based on the timing advance. As such, UE 115-a may have sufficient time after the transmission to transition from an uplink configuration to a downlink configuration. In other examples, certain symbols may not be used for communication between base station 105-a or UE 115-a (e.g., symbol blanking), and UE 115-a may use this time to transition between an uplink and downlink configuration. For example, after an uplink transmission, UE 115-a may refrain from communicating during one or more subsequent symbol periods to allow sufficient time to transition to a downlink configuration.

Additionally, to allow for more efficient use of resources, base station 105-a may support techniques for allocating resources to reduce the amount of time used to transition between uplink and downlink configurations. Specifically, base station 105-a may bundle resources allocated for communication in a specific link direction by allocating multiple consecutive slots for communication in the same link direction (e.g., uplink or downlink) or by supporting long bursts for control transmissions (e.g., uplink or downlink control transmissions). UE 115-a may receive an indication of the allocation of the multiple consecutive slots in a system information block (SIB), a master information block (MIB), control information transmitted using RRC configured resources, downlink or uplink grants (e.g., for the same or different transport blocks), etc. In such cases, base station 105-a and UE 115-a may support acknowledgment/negative acknowledgment (ACK/NACK) bundling for HARQ transmissions. That is, base station 105-a and UE 115-a may transmit HARQ responses for a group of slots allocated for a specific link direction. As a result, the number of HARQ transmissions may be reduced and more resources may be available for data transmissions in wireless communications system 200.

Figure 3:
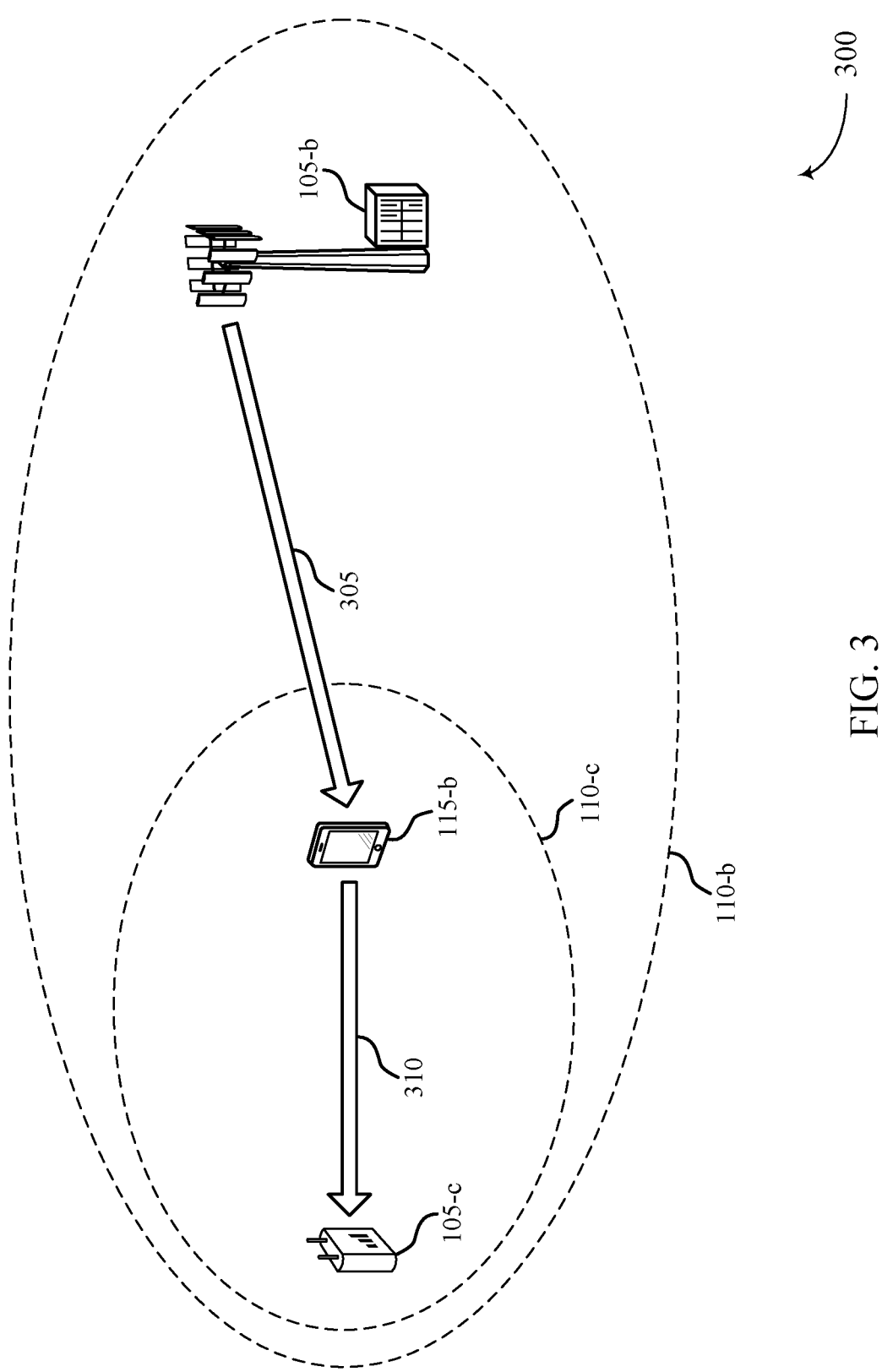
FIG. 3 illustrates an example of a wireless communications system that supports half-duplex operation in NR systems in accordance with various aspects of the present disclosure.

FIG. 3 illustrates an example of a wireless communications system 300 that supports half-duplex operation in NR systems in accordance with various aspects of the present disclosure. Wireless communications system 300 includes base station 105-b, base station 105-c, and UE 115-b, which may be examples of the corresponding devices described with reference to FIG. 1. Base station 105-b may provide communication coverage for coverage area 110-b, and base station 105-c may provide communication coverage for coverage area 110-c. Base station 105-b may communicate with UE 115-b on resources of a primary carrier or PCell and one or more secondary carriers or SCells, and base station 105-c may communicate with UE 115-b on resources of an SCell. In other examples, base station 105-c may communicate with UE 115-b on a PCell and/or SCell. As depicted in the example of FIG. 3, base station 105-b may transmit downlink signals on carrier 305 to UE 115-b, and UE 115-b may transmit uplink signals on carrier 310 to base station 105-c. The communications may be on a PCell or SCell depending on the particular configuration of UE 115-b. Although not shown, UE 115-b may transmit to base station 105-b and receive from base station 105-c using resources of carriers 305 and 310, respectively.

As indicated above, UE 115-b may support communication on multiple carriers to increase the bandwidth available for communication and, by extension, increase throughput. UE 115-b may support simultaneous communication in the same link direction (e.g., uplink or downlink) on resources of multiple carriers. That is, during a specific symbol period, UE 115-b may be capable of communicating with base station 105-b and base station 105-c in the same link direction. For communication in different link directions with base station 105-b and base station 105-c, UE 115-b may utilize a guard period (or some other transition duration) to transition between an uplink and downlink configuration. However, in some cases, UE 115-b may be scheduled for uplink transmissions on carrier 305 and downlink transmissions on carrier 310 during the same symbol period. But UE 115-b (e.g., a half-duplex UE 115) may not be capable of supporting bidirectional communication in the same symbol period. Further, if the different carriers are within the same frequency band, downlink transmissions on carrier 305 may interfere with uplink transmissions on carrier 310.

UE 115-b may support efficient techniques for communicating on resources of multiple carriers with different numerologies (e.g., different slot durations). Specifically, when UE 115-b is scheduled for bidirectional communication during a symbol period, UE 115-b may refrain from communicating on resources of a specific carrier. In some cases, a base station 105 may assign a priority to cells of base station 105-b and cells of base station 105-c. If a PCell, e.g., associated with base station 105-b, is assigned a higher priority (e.g., PCell driven design), UE 115-b may refrain from communicating on an SCell, e.g., associated with base station 105-c, during the symbol period. Alternatively, if the SCell is assigned a higher priority (e.g., SCell driven design), UE 115-*b* may refrain from communicating on the PCell during the symbol period. In some cases, the priority associated with the PCell and SCell may be based on a numerology of time and frequency resources used to communicate with respective base stations 105 associated with the PCell and SCell. For example, if the slot durations used for communication with the PCell are shorter than the slot durations used for communication with the SCell, the base station 105 may determine to prioritize communication with the PCell.

Figure 4:
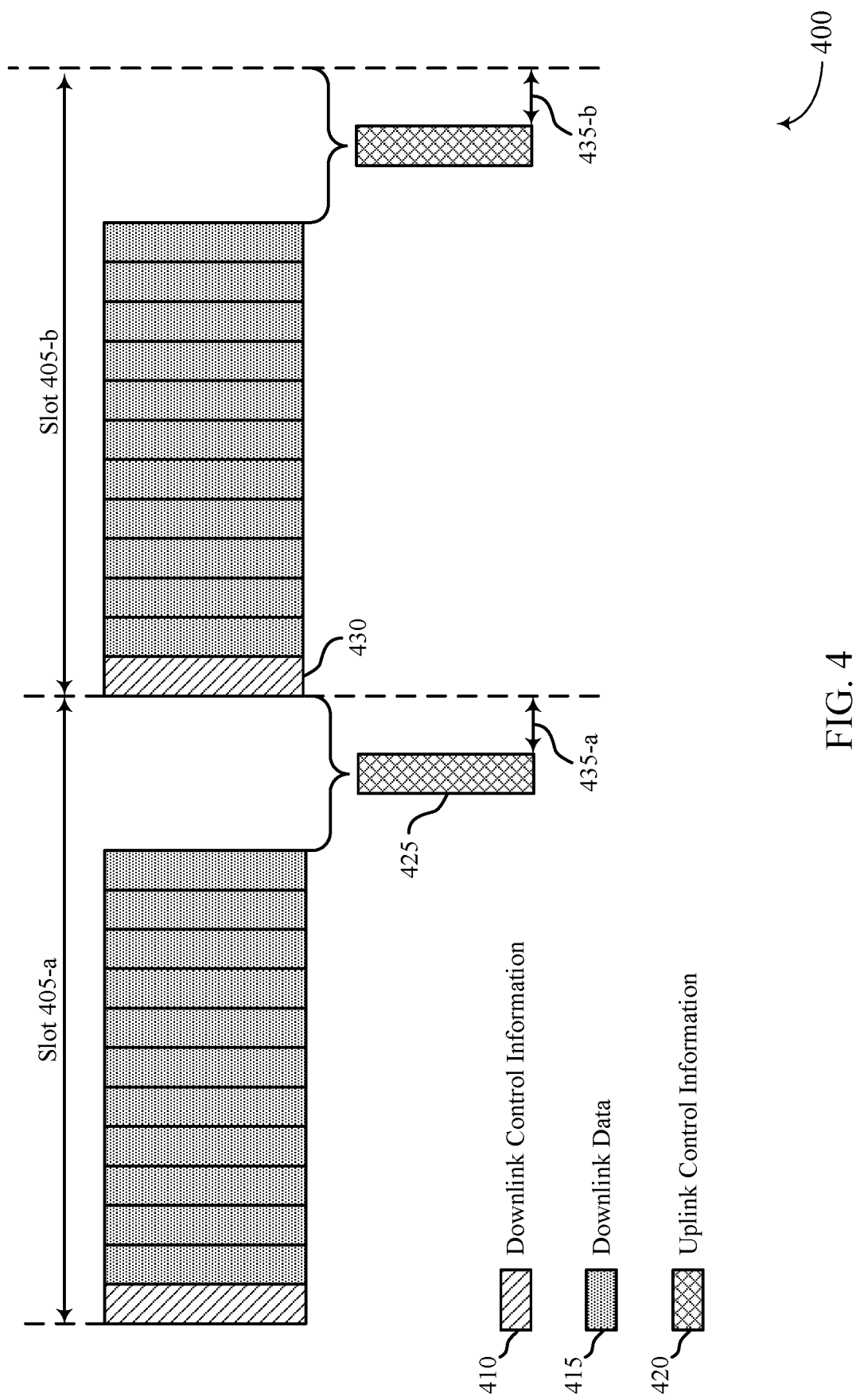
FIGS. 4-16 illustrate aspects of half-duplex operation in NR systems in accordance with various aspects of the present disclosure.

FIG. 4 illustrates an example of resources 400 allocated for communication between wireless devices using TDD in a system that supports half-duplex operation in NR systems in accordance with various aspects of the present disclosure. A base station 105 may communicate with a UE 115 on resources of a carrier during slots 405. Slots 405 may include a number of symbols each allocated for communication in a specific link direction or for transitioning between uplink, downlink, and sidelink configurations. The structure of each slot 405 may be based on a nominal symbol period duration for symbols within the slot 405, a numerology associated with one or more symbols within the slot 405, a number of control symbols within the slot 405, or a quantity of symbols of a specific link direction within the slot 405 within a carrier or across two or more carriers. In the example of FIG. 4, each slot 405 may include 14 symbols. However, in other examples, each slot 405 may include a different number of symbols (e.g., 12 symbols). Slots 405-*a* and 405-*b* may be examples of downlink centric slots.

Slot 405-*a* may be adjacent to slot 405-*b* in the time domain, and each slot may be self-contained. That is, each slot 405 may include symbols allocated for uplink communication and symbols allocated for downlink communication. In the example of FIG. 4, slot 405-*a* and slot 405-*b* may each include symbols allocated for communication of downlink control information 410, downlink data 415, and uplink control information 420. In other examples, a slot may include symbols allocated for communication of downlink control information, downlink data, uplink control information, and uplink data. As illustrated, symbol 425 of slot 405-*a* (i.e., the last symbol of slot 405-*a*) may be allocated for an uplink transmission, and symbol 430 of slot 405-*b* (i.e., first symbol of slot 405-*b*) may be allocated for a downlink transmission.

To allow sufficient time to transition from an uplink configuration to a downlink configuration, the UE 115 may transmit uplink control information 420 in symbol 425 earlier based on a timing advance 435 (negative time offset). Consequently, the uplink transmission during symbol 425 may overlap with a previous symbol (e.g., allocated as a guard period). However, in some examples, the duration of the guard period allocated for the UE 115 to transition from a downlink configuration to an uplink configuration within slot 405-*a* may be excessive. Therefore, by transmitting the uplink control information 420 in symbol 425 earlier, the UE 115 may efficiently distribute the time allocated in the guard period to, for example, accommodate its RF capabilities. As a result, the UE 115 may have sufficient time to transition from downlink to uplink within slot 405-*a* and then from uplink to downlink across slots 405-*a* and 405-*b*. In some cases, both full-duplex UEs 115 and half-duplex UEs 115 may communicate using a timing advance.

The timing advance may be a predetermined offset or may be indicated in a timing advance command from the base station 105. In both cases, the base station 105 may transmit a message to the UE 115 to indicate whether the UE 115 should apply the timing advance to all transmissions or specific transmissions. Such an indication may be transmitted in a SIB, MIB, or using RRC signaling when the UE 115 accesses a cell, for example. In some cases, the timing advance offset may depend on the numerology (or structure) of slot 405-*a*. The base station 105 may transmit an indication of the values associated with the numerology of slot 405-*a* to the UE 115 in a synchronization signal or SIB when the UE 115 initially accesses a cell. Additionally or alternatively, the UE 115 may derive the values associated with the numerology of slot 405-*a* based on a numerology of a control channel or data channel.

Although FIG. 4 illustrates an example of transitioning from an uplink configuration to a downlink configuration, the above techniques may apply to transitioning between any two of a downlink configuration, uplink configuration, or sidelink configuration. Additionally, although FIG. 4 illustrates an example of transitioning between link directions across slots (i.e., inter-slot transitioning), the above techniques may apply to transitioning between link directions within a slot (i.e., intra-slot transitioning).

Figure 5:
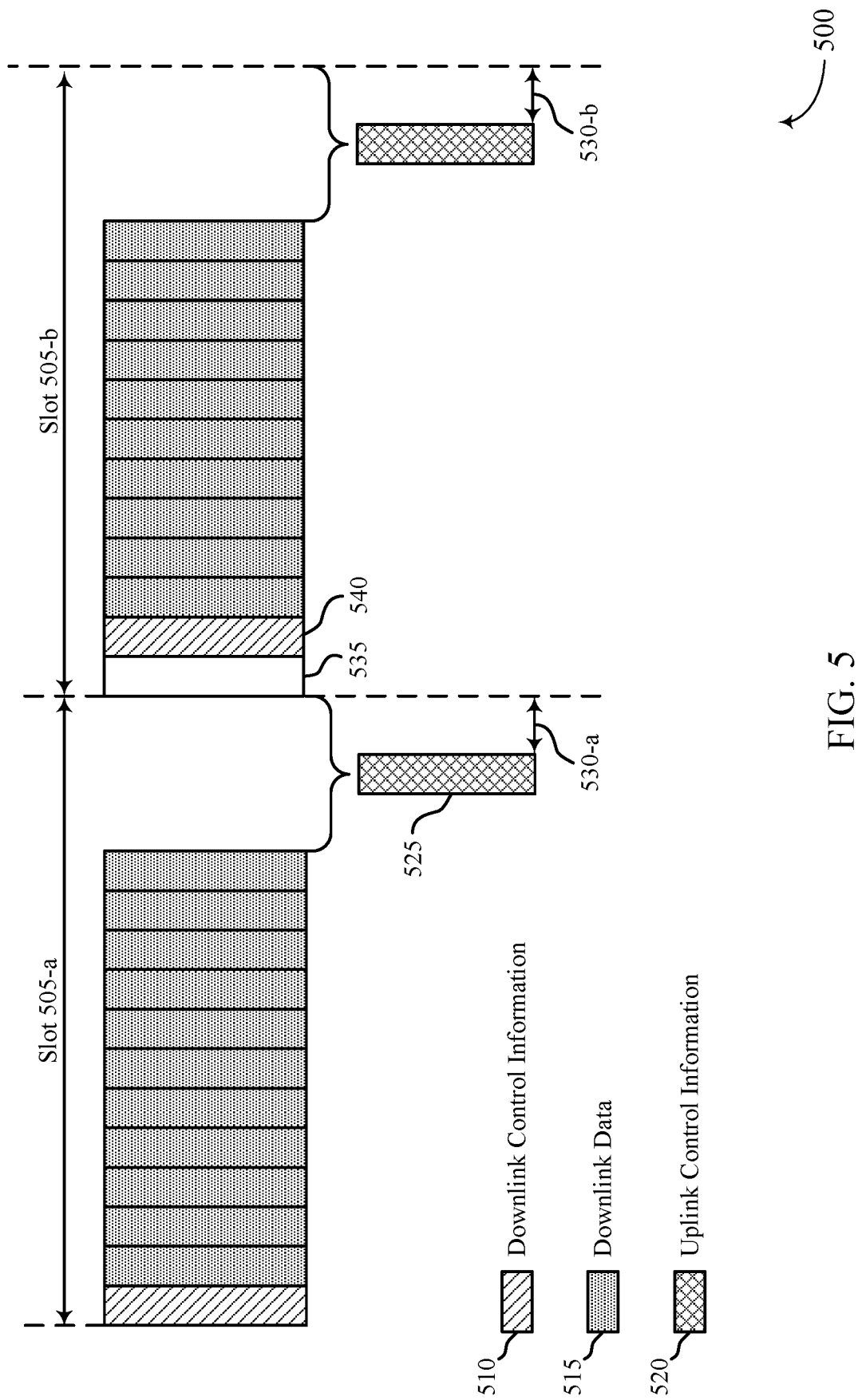

FIG. 5 illustrates an example of resources 500 allocated for communication between wireless devices using TDD in a system that supports half-duplex operation in NR systems in accordance with various aspects of the present disclosure. A base station 105 may communicate with a UE 115 on resources of a carrier using slots 505. Slots 505 may include a number of symbols each allocated for communication in a specific link direction or for transitioning between uplink, downlink, and sidelink configurations. The structure of each slot 505 may be based on a nominal symbol period duration for symbols within the slot 505, a numerology associated with one or more symbols within the slot 505, a number of control symbols within the slot 505, or a quantity of symbols of a specific link direction within the slot 505 within a carrier or across two or more carriers. In the example of FIG. 5, each slot 505 may include 14 symbols. However, in other examples, each slot 505 may include a different number of symbols (e.g., 12 symbols).

Slot 505-*a* may be adjacent to slot 505-*b* in the time domain, and each slot may be self-contained. That is, each slot 505 may include symbols allocated for uplink communication and symbols allocated for downlink communication. In the example of FIG. 5, slot 505-*a* and slot 505-*b* may each include symbols allocated for communication of downlink control information 510, downlink data 515, and uplink control information 520. In other examples, a slot may include symbols allocated for communication of downlink control information, downlink data, uplink control information, and uplink data. As illustrated, symbol 525 of slot 505-*a* may be allocated for an uplink transmission, and a subsequent symbol 540 of slot 505-*b* may be allocated for a downlink transmission. To allow time for transitioning from an uplink configuration to a downlink configuration, the UE 115 may refrain from communicating during symbol period 535. In such cases, downlink control information 510 (and possibly other channels or signals such as demodulation reference signals (DMRS)) may be transmitted in a subsequent symbol (i.e., symbol 540).

Although FIG. 5 illustrates an example of transitioning from an uplink configuration to a downlink configuration, the above techniques may apply to transitioning between any two of a downlink configuration, uplink configuration, or sidelink configuration. Additionally, although FIG. 5 illustrates an example of transitioning between link directions across slots (i.e., inter-slot transitioning), the above techniques may apply to transitioning between link directions within a slot (i.e., intra-slot transitioning). Further, the above techniques may be applied independently or in addition to applying a timing advance 530.

Figure 6:
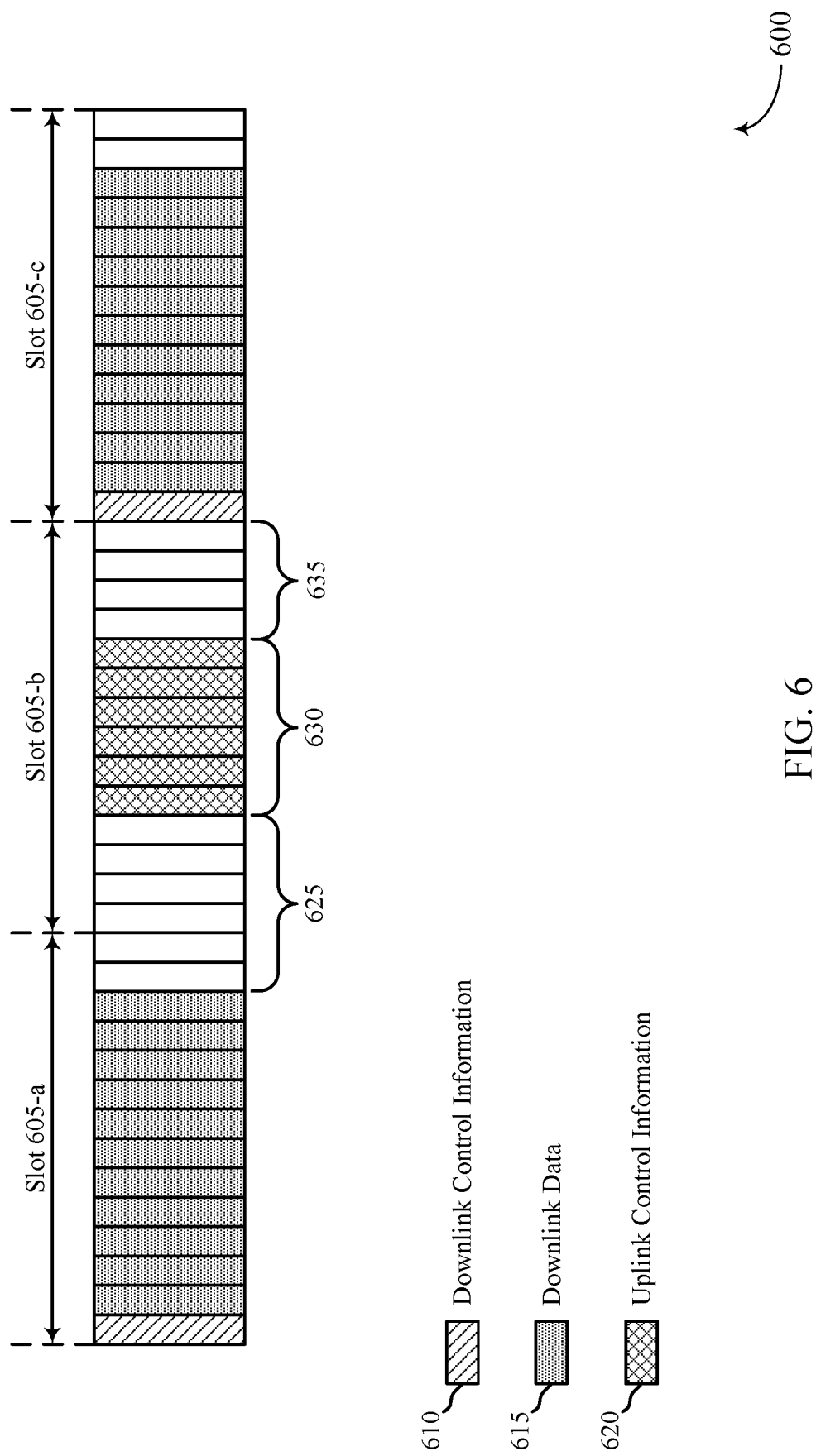

FIG. 6 illustrates an example of resources 600 allocated for communication between wireless devices using TDD in a system that supports half-duplex operation in NR systems in accordance with various aspects of the present disclosure. A base station 105 may communicate with a UE 115 on resources of a carrier using slots 605. Slots 605 may include a number of symbols each allocated for communication in a specific link direction or for transitioning between uplink, downlink, and sidelink configurations. The structure of each slot 605 may be based on a nominal symbol period duration for symbols within the slot 605, a numerology associated with one or more symbols within the slot 605, a number of control symbols within the slot 605, or a quantity of symbols of a specific link direction within the slot 605 within a carrier or across two or more carriers. In the example of FIG. 6, each slot 605 may include 14 symbols. However, in other examples, each slot 605 may include a different number of symbols (e.g., 12 symbols).

Slots 605-*a*, 605-*b*, and 605-*c* may be adjacent in the time domain. Slot 605-*a* may include symbols allocated for downlink control information 610 and downlink data 615, slot 605-*b* may include symbols allocated for uplink control information 620, and slot 605-*c* may include symbols allocated for downlink control information 610 and downlink data 615. In some cases, the UE 115 may refrain from communicating during symbol periods 625 to allow sufficient time for transitioning between uplink and downlink configurations. In such cases, the UE 115 may transmit a longer burst of uplink control information 620 during symbol periods 630. The UE 115 may then use symbol periods 635 to transition back to a downlink configuration to receive downlink control information 610 and downlink data 615 in slot 605-*c*. The number of symbols allocated for transitioning between configurations (or link directions) may be based on a type or capability (e.g., half-duplex configuration, RF switching time, FDD/TDD capability, carrier aggregation capability, etc.) of the UE 115. Additionally, the number of symbols allocated for transitioning between configurations (or link directions) may depend on a slot structure. As an example, for short symbol durations, more symbols may be allocated for transitioning between configurations.

Although FIG. 6 illustrates an example of transitioning from a downlink configuration to an uplink configuration then back to a downlink configuration, the above techniques may apply to transitioning between any two of a downlink configuration, uplink configuration, or sidelink configuration. Additionally, although FIG. 6 illustrates an example of transitioning between link directions across slots (i.e., inter-slot transitioning), the above techniques may apply to transitioning between link directions within a slot (i.e., intra-slot transitioning). Further, the above techniques may be applied independently or in addition to applying a timing advance.

Figure 7:
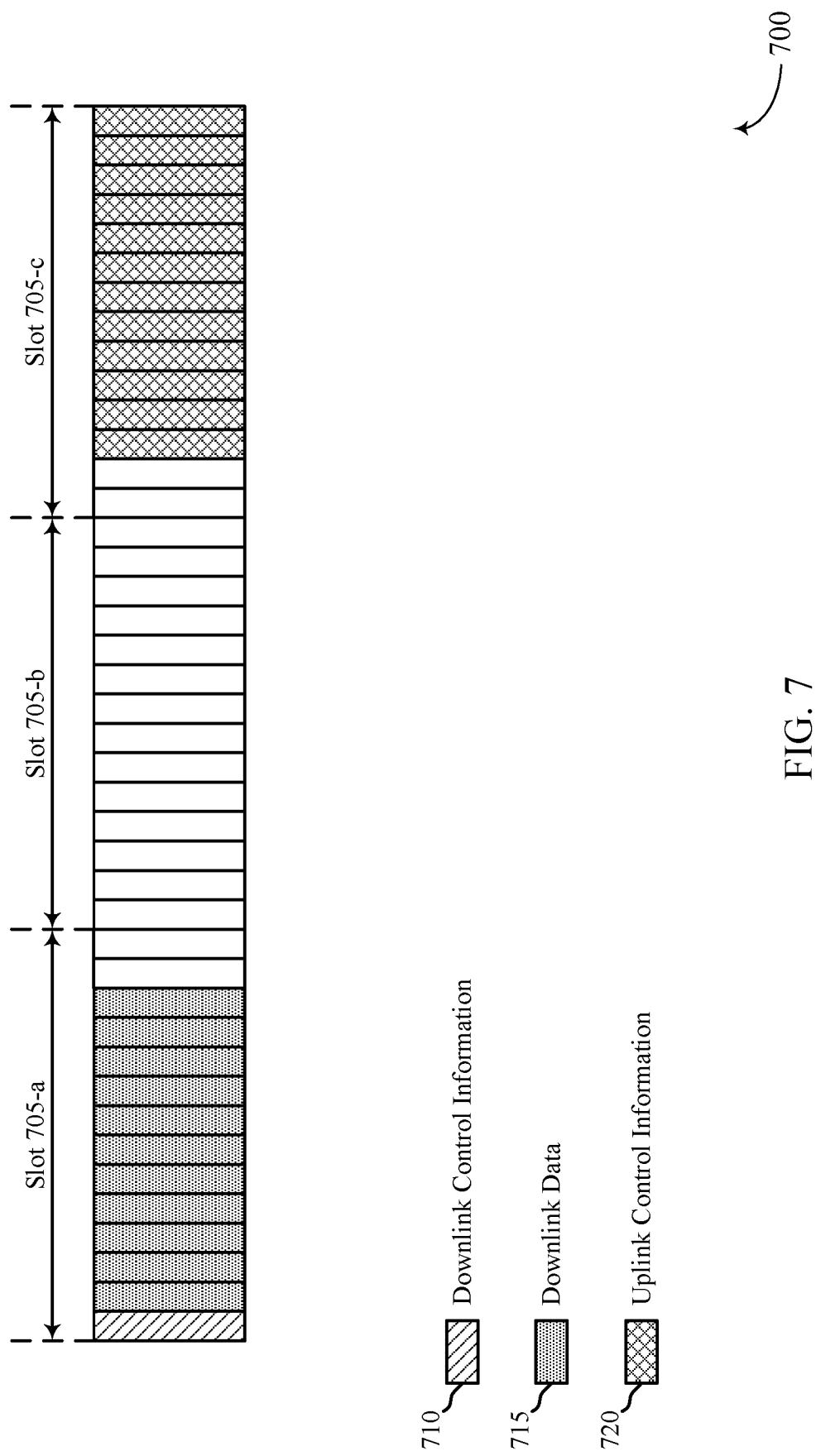

FIG. 7 illustrates an example of resources 700 allocated for communication between wireless devices using TDD in a system that supports half-duplex operation in NR systems in accordance with various aspects of the present disclosure. A base station 105 may communicate with a UE 115 on resources of a carrier using slots 705. Slots 705 may include a number of symbols each allocated for communication in a specific link direction or for transitioning between uplink, downlink, and sidelink configurations. The structure of each slot 705 may be based on a nominal symbol period duration for symbols within the slot 705, a numerology associated with one or more symbols within the slot 705, a number of control symbols within the slot 705, or a quantity of symbols of a specific link direction within the slot 705 within a carrier or across two or more carriers. In the example of FIG. 7, each slot 705 may include 14 symbols. However, in other examples, each slot 705 may include a different number of symbols (e.g., 12 symbols).

Slots 705-*a*, 705-*b*, and 705-*c* may be adjacent in the time domain. Slot 705-*a* may include symbols allocated for downlink control information 710 and downlink data 715, and slot 705-*c* may include symbols allocated for uplink control information 720. Specifically, slot 705-*c* may be allocated for a long burst of uplink control information 720 to reduce the amount of time used for transitioning in a wireless communications system. In some cases, the UE 115 may refrain from communicating during slot 705-*b* to allow sufficient time for transitioning from a downlink configuration to an uplink configuration. The number of slots 705 allocated for transitioning between configurations (or link directions) may be based on a type or capability (e.g., half-duplex configuration, RF switching time, FDD/TDD capability, carrier aggregation capability, etc.) of the UE 115. Additionally, the number of slots 705 allocated for transitioning between configurations may depend on a structure of the slot 705. As an example, for short slot durations, more slots 705 may be allocated for transitioning between configurations.

Although FIG. 7 illustrates an example of transitioning from a downlink configuration to an uplink configuration, the above techniques may apply to transitioning between any two of a downlink configuration, uplink configuration, or sidelink configuration. Further, the above techniques may be applied independently or in addition to applying a timing advance.

Figure 8:
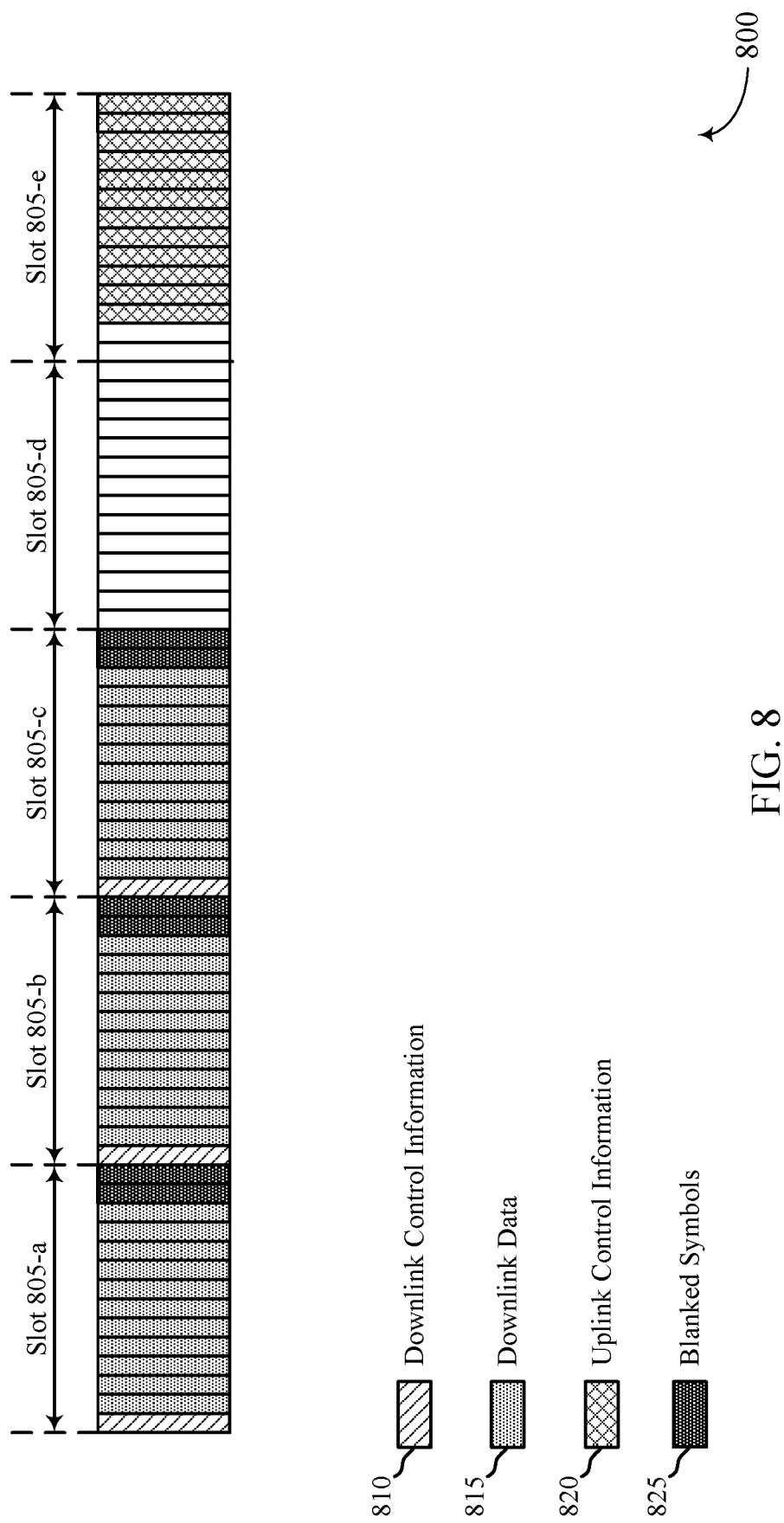

FIG. 8 illustrates an example of resources 800 allocated for communication between wireless devices using TDD in a system that supports half-duplex operation in NR systems in accordance with various aspects of the present disclosure. A base station 105 may communicate with a UE 115 on resources of a carrier using slots 805. Slots 805 may include a number of symbols each allocated for communication in a specific link direction or for transitioning between uplink, downlink, and sidelink configurations. The structure of each slot 805 may be based on a nominal symbol period duration for symbols within the slot 805, a numerology associated with one or more symbols within the slot 805, a number of control symbols within the slot 805, or a quantity of symbols of a specific link direction within the slot 805 within a carrier or across two or more carriers. In the example of FIG. 8, each slot 805 may include 14 symbols. However, in other examples, each slot 805 may include a different number of symbols (e.g., 12 symbols).

Slots 805 may be adjacent in the time domain. To reduce the amount of time used to transition between uplink and downlink configurations, the UE 115 may communicate in a single link direction in a given slot 805. For example, the base station 105 may configure the UE 115 to refrain from communicating in a specific link direction in a given slot 805 (e.g., based on a type or capability of the UE 115). In the example of FIG. 8, the UE 115 may receive downlink control information 810 and downlink data 815 during slots 805-*a*, 805-*b*, and 805-*c*, and the UE 115 may refrain from communicating in the uplink direction during blanked symbols 825. The UE 115 may then use slot 805-*d* to transition to an uplink configuration, and the UE 115 may transmit uplink control information 820 during slot 805-*e*. To facilitate this operation, base station 105 may schedule the UE 115 to communicate (or operate) in the same link direction over a plurality of slots 805 such as by providing multi-slot downlink or uplink grants and refraining from scheduling (or requiring) the UE 115 to transition between configurations (or link directions) in a same slot 805. In some cases, the uplink transmission in slot 805-e may be a long burst of uplink control information 820.

When multiple consecutive slots 805 are used for communication in a single link direction, the base station 105 and UE 115 may support ACK/NACK bundling for HARQ transmissions. That is, the base station 105 and UE 115 may transmit HARQ responses for a group of slots 805 used for communication in a specific link direction. As a result, the number of HARQ transmissions may be reduced and more resources may be available for data transmissions in a wireless communications system.

Although FIG. 8 illustrates an example of transitioning from a downlink configuration to an uplink configuration, the above techniques may apply to transitioning between any two of a downlink configuration, uplink configuration, or sidelink configuration.

Figure 9:
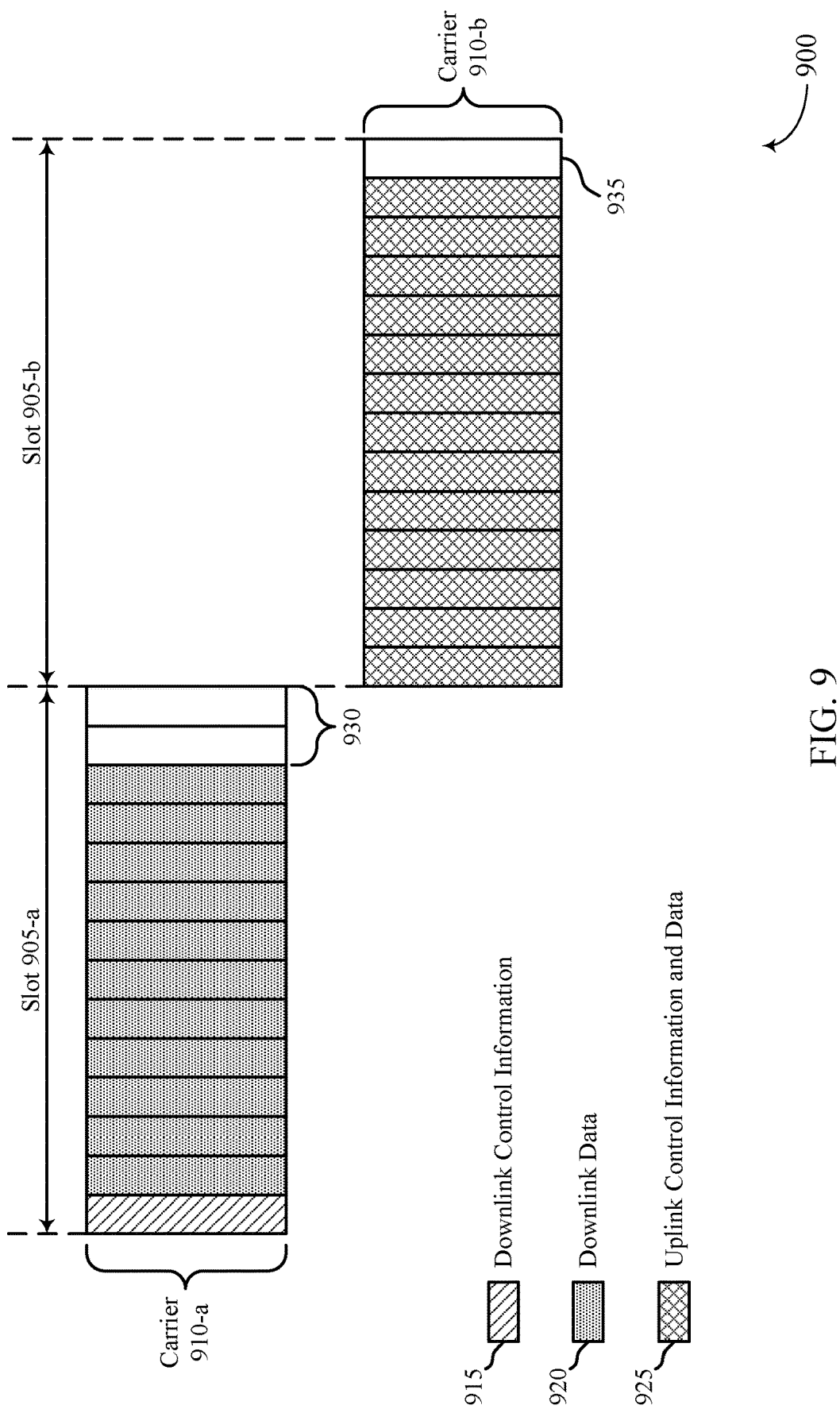

FIG. 9 illustrates an example of resources 900 allocated for communication between wireless devices using FDD in a system that supports half-duplex operation in NR systems in accordance with various aspects of the present disclosure. A base station 105 may communicate with a UE 115 during slot 905-a on resources of carrier 910-a designated for downlink communication and during slot 905-b on resources of carrier 910-b designated for uplink communication. Slots 905 may include a number of symbols each allocated for communication in a specific link direction or for transitioning between uplink, downlink, and sidelink configurations. The structure of each slot 905 may be based on a nominal symbol period duration for symbols within the slot 905, a numerology associated with one or more symbols within the slot 905, a number of control symbols within the slot 905, or a quantity of symbols of a specific link direction within the slot 905 within a carrier or across two or more carriers. In the example of FIG. 9, each slot 905 may include 14 symbols. However, in other examples, each slot 905 may include a different number of symbols (e.g., 12 symbols).

Slot 905-a may be adjacent to slot 905-b in the time domain. Slot 905-a may include symbols allocated for communication of downlink control information 915 and downlink data 920, and slot 905-b may include symbols allocated for communication of uplink control information and data 925. In some cases, the UE 115 may refrain from communicating during symbol periods 930, and the UE 115 may use this time to transition from a downlink configuration to an uplink configuration. Similarly, the UE 115 may refrain from communicating during symbol period 935, and the UE 115 may use this time to transition from an uplink configuration to a downlink configuration.

The UE 115 may refrain from communicating during certain symbol periods based on signaling received from the base station 105. For example, the base station 105 may transmit an indication of symbols that are valid, and the UE 115 may refrain from communicating (e.g., symbol blanking) during other symbol periods based on the indication. The amount of symbols allocated to the UE 115 for switching between configurations may be based on, for example, the category of the UE 115 (e.g., type 0 and type 1 UEs) or the capability of the UE 115 (e.g., half-duplex or full-duplex). Further, the amount of symbols allocated to the UE 115 for switching between configurations may depend on the structure of a slot 905 (e.g., more symbols for shorter symbol durations).

Although FIG. 9 illustrates an example of transitioning from a downlink configuration to an uplink configuration, the above techniques may apply to transitioning between any two of a downlink configuration, uplink configuration, or sidelink configuration. The number of symbols allocated for transitioning from one configuration to another may vary based on the configurations (e.g., two (2) symbol periods for downlink to uplink and one (1) symbol period for uplink to downlink).

Figure 10:
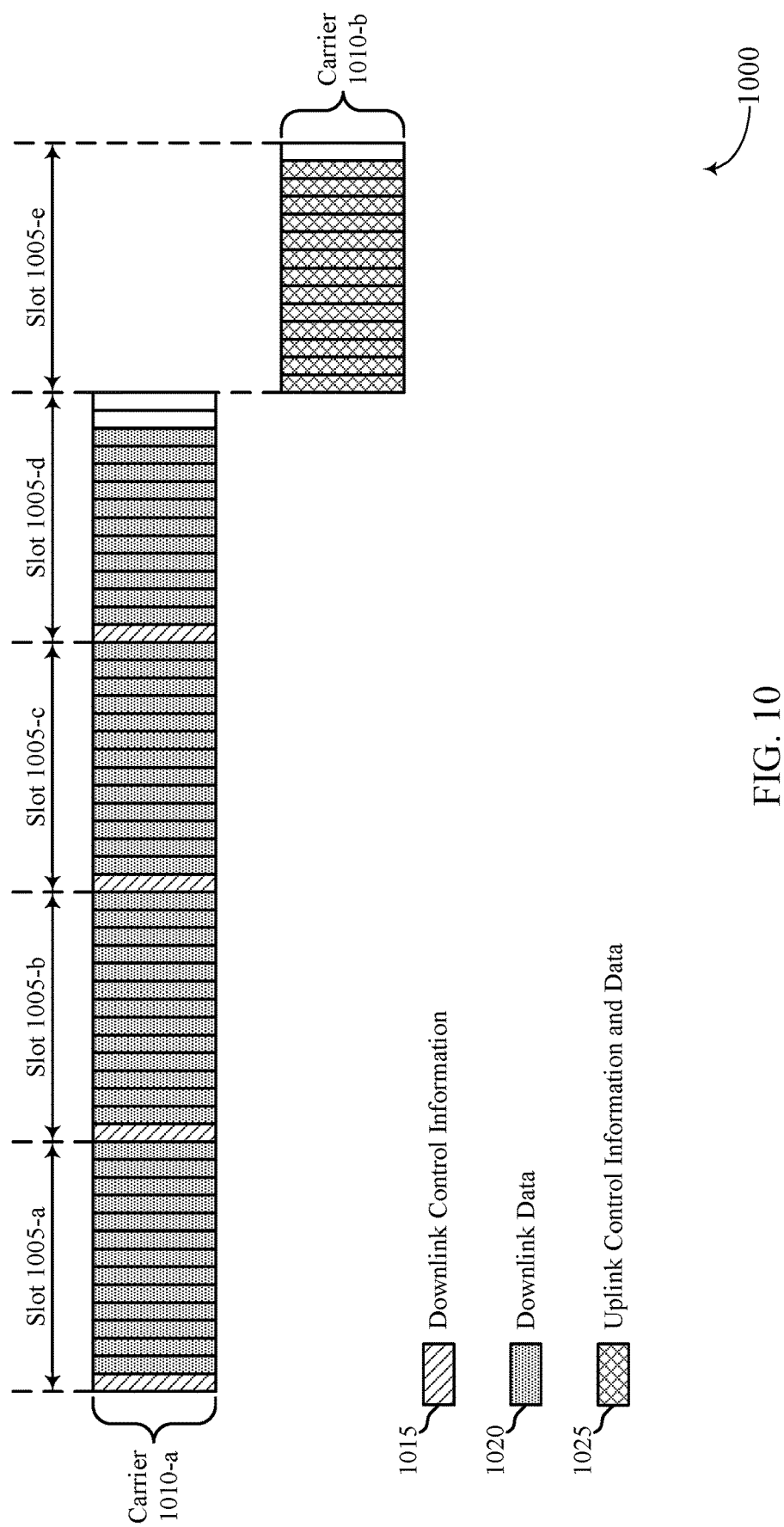

FIG. 10 illustrates an example of resources 1000 allocated for communication between wireless devices using FDD in a system that supports half-duplex operation in NR systems in accordance with various aspects of the present disclosure. A base station 105 may support downlink communication with a UE 115 on resources of carrier 1010-a during slots 1005-a, 1005-b, 1005-c, and 1005-d, and the base station 105 may support uplink communication with the UE 115 on resources of carrier 1010-b during slot 1005-e. The structure of each slot 1005 may be based on a nominal symbol period duration for symbols within the slot 1005, a numerology associated with one or more symbols within the slot 1005, a number of control symbols within the slot 1005, or a quantity of symbols of a specific link direction within the slot 1005 within a carrier or across two or more carriers. In the example of FIG. 10, each slot 1005 may include 14 symbols. However, in other examples, each slot 1005 may include a different number of symbols (e.g., 12 symbols).

Slots 1005 may be adjacent to each other in the time domain. Slots 1005-a, 1005-b, 1005-c, and 1005-d may each include symbols allocated for communication of downlink control information 1015 and downlink data 1020, and slot 1005-e may include symbols allocated for uplink control information and data 1025. To reduce the amount of time used for transitioning between uplink and downlink configurations, the base station 105 may allocate multiple subsequent slots for communication with the UE 115 in a specific link direction. For example, the base station 105 may allocate slots 1005-a, 1005-b, 1005-c, and 1005-d for downlink communication. In such cases, the base station 105 and UE 115 may support ACK/NACK bundling for HARQ transmissions. That is, the base station 105 and UE 115 may transmit HARQ responses for a group of slots 1005 allocated for a specific link direction. As a result, the number of HARQ transmissions may be reduced and more resources may be available for data transmissions in a wireless communications system.

Although FIG. 10 illustrates an example of transitioning from a downlink configuration to an uplink configuration, the above techniques may apply to transitioning between any two of a downlink configuration, uplink configuration, or sidelink configuration.

Figure 11:
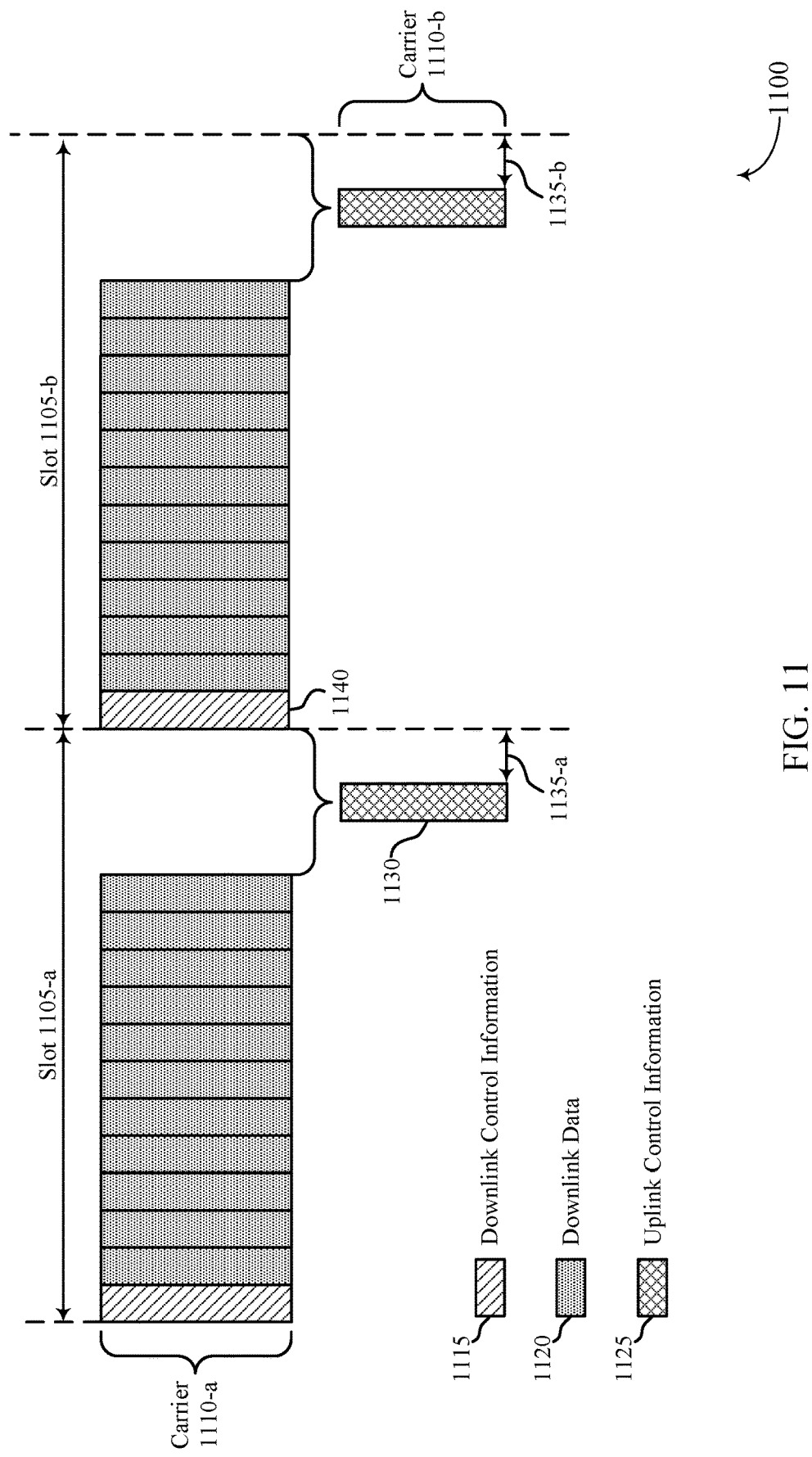

FIG. 11 illustrates an example of resources 1100 allocated for communication between wireless devices using flexible duplex FDD in a system that supports half-duplex operation in NR systems in accordance with various aspects of the present disclosure. For flexible duplex FDD, a UE 115 may transmit uplink signals in a frequency band allocated for downlink communication and vice versa. A base station 105 may communicate with the UE 115 during slots 1105 on resources of a first carrier 1110-a designated for downlink communication and a second carrier 1110-b designated for uplink communication. The structure of each slot 1105 may be based on a nominal symbol period duration for symbols within the slot 1105, a numerology associated with one or more symbols within the slot 1105, a number of control symbols within the slot 1105, or a quantity of symbols of a specific link direction within the slot 1105 within a carrier or across two or more carriers. In the example of FIG. 11, each slot 1105 may include 14 symbols. However, in other examples, each slot 1105 may include a different number of symbols (e.g., 12 symbols).

Slot 1105-a may be adjacent to slot 1105-b in the time domain, and each slot may be self-contained. That is, each slot 1105 may include symbols allocated for uplink communication and symbols allocated for downlink communication. In the example of FIG. 11, slot 1105-a and slot 1105-b may each include symbols allocated for communication of downlink control information 1115, downlink data 1120, and uplink control information 1125. As illustrated, symbol 1130 of slot 1105-a may be allocated for an uplink transmission, and a subsequent symbol 1140 of slot 1105-b may be allocated for a downlink transmission.

To allow sufficient time to transition from an uplink configuration to a downlink configuration, the UE 115 may transmit uplink control information 1125 in symbol 1130 earlier based on a timing advance 1135 (negative time offset). Consequently, the uplink transmission during symbol 1130 may overlap with a previous symbol (e.g., allocated as a guard period). However, the duration of the guard period allocated for the UE 115 to transition from a downlink configuration to an uplink configuration within slot 1105-a may be excessive. Therefore, by transmitting the uplink control information 1125 in symbol 1130 earlier, the UE 115 may efficiently distribute the time allocated in the guard period. As a result, the UE 115 can have sufficient time to transition from downlink to uplink within slot 1105-a and then from uplink to downlink across slots 1105-a and 1105-b. In some cases, both full-duplex UEs 115 and half-duplex UEs 115 may communicate using a timing advance. If a cell or the UE 115 does not support flexible duplex FDD, the timing advance offset may be zero (0) for UEs 115 served by the cell or specific to a UE 115. However, if a cell or the UE 115 supports flexible duplex FDD, the timing advance offset may be greater than zero (0) (e.g., 20 μs) for UEs 115 served by the cell or specific to a UE 115.

Although FIG. 11 illustrates an example of transitioning from an uplink configuration to a downlink configuration, the above techniques may apply to transitioning between any two of a downlink configuration, uplink configuration, or sidelink configuration. Additionally, although FIG. 11 illustrates an example of transitioning between link directions across slots (i.e., inter-slot transitioning), the above techniques may apply to transitioning between link directions within a slot (i.e., intra-slot transitioning).

Figure 12:
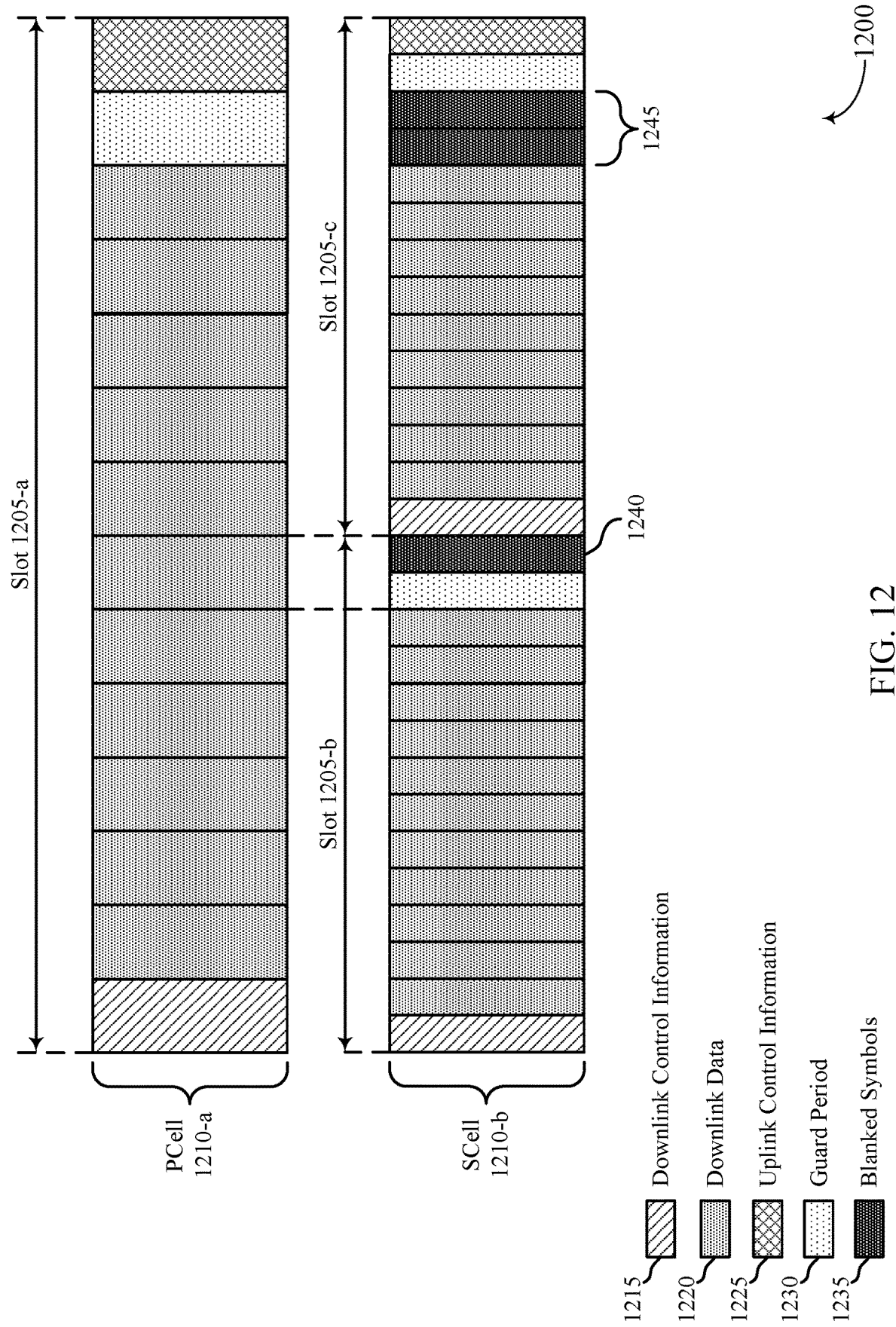

FIG. 12 illustrates an example of resources 1200 allocated for communication using carrier aggregation in a system that supports half-duplex operation in NR systems in accordance with various aspects of the present disclosure. A base station 105 may communicate with a UE 115 during slot 1205-a of a PCell 1210-a and during slots 1205-b and 1205-c of an SCell 1210-b. Slots 1205 may include a number of symbols each allocated for communication in a specific link direction or for transitioning between uplink, downlink, and sidelink configurations. The structure of each slot 1205 may be based on a nominal symbol period duration for symbols within the slot 1205, a numerology associated with one or more symbols within the slot 1205, a number of control symbols within the slot 1205, or a quantity of symbols of a specific link direction within the slot 1205 within a carrier or across two or more carriers. In some cases, the structure of slots 1205 used for communication on different carriers may be different. For example, symbols included in slot 1205-a of PCell 1210-a may have a longer duration than symbols included in slots 1205-b and 1205-c of SCell 1210-b.

Slot 1205-a of PCell 1210-a may overlap with slots 1205-b and 1205-c of SCell 1210-b in the time domain, and each slot 1205 may be self-contained. That is, each slot 1205 may include symbols allocated for uplink communication and symbols allocated for downlink communication. Each slot 1205 may be a downlink centric slot. Specifically, slots 1205 may each include symbols allocated for communication of downlink control information 1215, downlink data 1220, and uplink control information 1225. Slots 1205 may also include guard periods 1230 for transitioning between configurations (e.g., uplink and downlink). As illustrated, the UE 115 may be scheduled for simultaneous uplink and downlink communication on resources of different carriers in some symbols (e.g., symbol 1245). However, half-duplex UEs 115 may not be able to support simultaneous uplink and downlink communication. Further, if PCell 1210-a and SCell 1210-b are within the same frequency band, uplink transmissions and downlink transmissions scheduled during the same symbol period on these cells may interfere with each other (e.g., for half-duplex UEs 115 and full-duplex UEs 115). Accordingly, it may be appropriate for a wireless communications system to support techniques for preventing conflicting transmissions.

The UE 115 may support efficient techniques for coordinating with the base station 105 to prevent conflicting transmissions. In some cases, the base station 105 may establish different priorities for communication on resources of PCell 1210-a and for communication on resources of SCell 1210-b, and the base station 105 may signal this information to the UE 115. In some cases, the signaling may include an indication of a cell identity of the cell with the higher priority, and the UE 115 may prioritize communication on resources of that cell based on receiving the cell identity. The cell identity may indicate that the cell is a PCell, PSCell, or SCell. In the example of FIG. 12, the base station 105 may prioritize communication on PCell 1210-a (i.e., PCell driven design).

Accordingly, the UE 115 scheduled for simultaneous uplink and downlink communication may refrain from communicating on resources of SCell 1210-b. For example, the UE 115 may refrain from communicating during symbol 1240 of SCell 1210-b (e.g., refrain from transmitting uplink control information 1225). Similarly, the UE 115 may refrain from communicating during symbols 1245 of SCell 1210-b (e.g., refrain from monitoring for downlink data 1220), and, in some cases, the base station 105 may refrain from transmitting downlink data 1220 on symbols 1245 of SCell 1210-b. The process of refraining from transmitting or receiving on specific symbols may be referred to as symbol blanking, and symbol 1240 and symbols 1245 may be referred to as blanked symbols 1235.

As indicated above, the decision to communicate on specific symbols may be based on a configuration of the carrier with the higher priority. In some cases, rather than refraining from transmitting during specific symbols, the UE 115 or base station 105 may align transmissions with the prioritized cell. For example, if symbols of a prioritized cell are allocated for downlink communication, the base station 105 or UE 115 may use the corresponding symbol or symbols of another cell for downlink communication. In such cases, the UE 115 may monitor for control information on one carrier and process data on another carrier. In addition, for full-duplex UEs 115, the UE 115 may determine whether to perform symbol blanking based on whether the PCell 1210-a and SCell 1210-b are within the same frequency band (e.g., for intra-band carrier aggregation).

Although FIG. 12 illustrates an example of symbols of a PCell 1210-*a* with longer durations than symbols of an SCell 1210-*b*, the above techniques apply to various combinations of numerologies for different cells. For example, symbols of the SCell 1210-*b* may have longer durations than symbols of the PCell 1210-*a*. Further, although FIG. 12 illustrates an example of a downlink transmission scheduled on resources of a cell during the same symbol period as an uplink transmission scheduled on another cell, the above techniques may apply to any combination of uplink transmissions, downlink transmissions, or sidelink transmissions scheduled simultaneously on resources of different cells.

Figure 13:
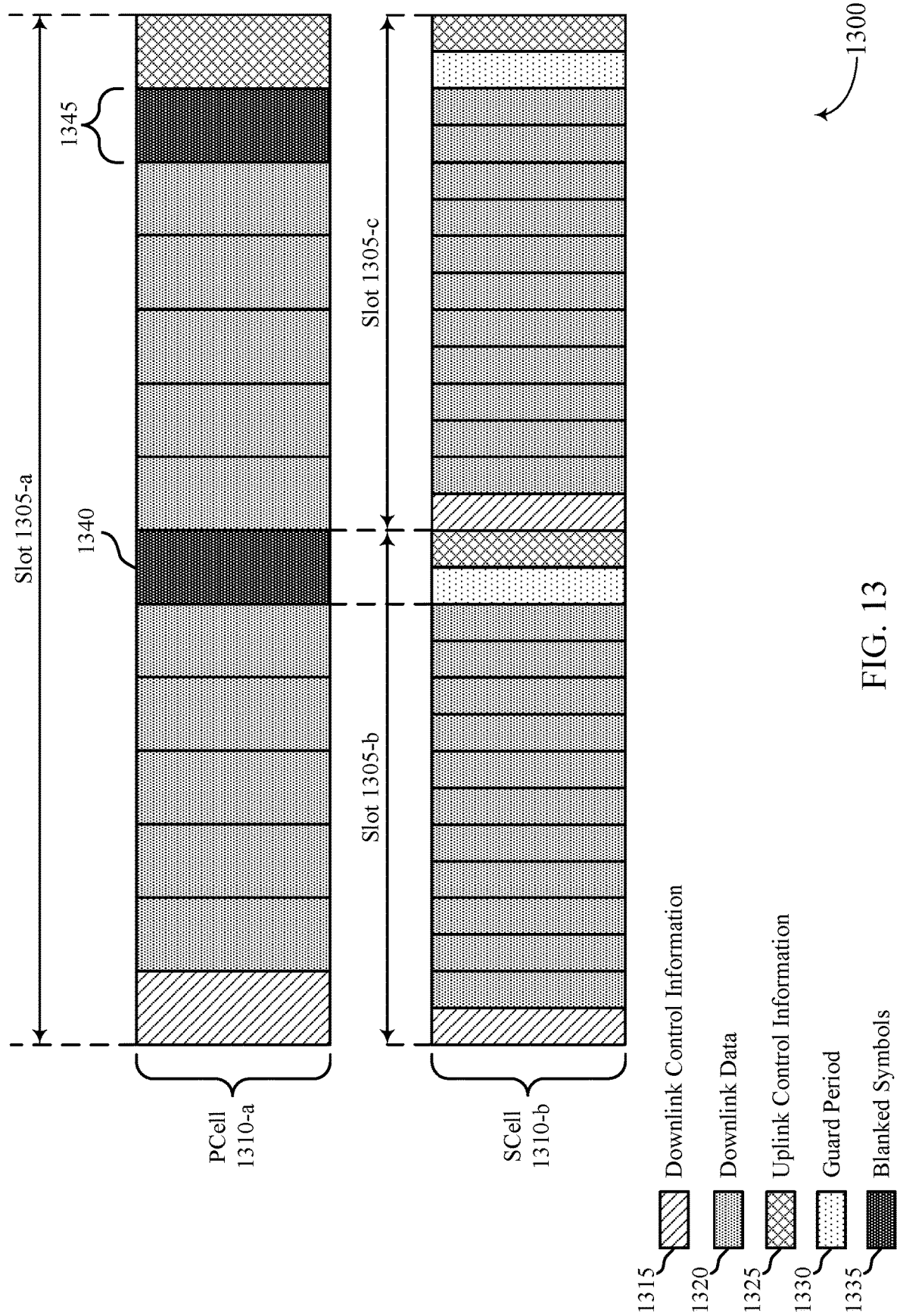

FIG. 13 illustrates an example of resources 1300 allocated for communication using carrier aggregation in a system that supports half-duplex operation in NR systems in accordance with various aspects of the present disclosure. A base station 105 may communicate with a UE 115 during slot 1305-*a* of a PCell 1310-*a* and during slots 1305-*b* and 1305-*c* of an SCell 1310-*b*. Slots 1305 may include a number of symbols each allocated for communication in a specific link direction or for transitioning between uplink, downlink, and sidelink configurations. The structure of each slot 1305 may be based on a nominal symbol period duration for symbols within the slot 1305, a numerology associated with one or more symbols within the slot 1305, a number of control symbols within the slot 1305, or a quantity of symbols of a specific link direction within the slot 1305 within a carrier or across two or more carriers. In some cases, the structure of slots 1305 used for communication on different carriers may be different. For example, symbols included in slot 1305-*a* of PCell 1310-*a* may have a longer duration than symbols included in slots 1305-*b* and 1305-*c* of SCell 1310-*b*.

Slot 1305-*a* of PCell 1310-*a* may overlap with slots 1305-*b* and 1305-*c* of SCell 1310-*b* in the time domain, and each slot 1305 may be self-contained. That is, each slot 1305 may include symbols allocated for uplink communication and symbols allocated for downlink communication. Each slot 1305 may be a downlink centric slot. Specifically, slots 1305 may each include symbols allocated for communication of downlink control information 1315, downlink data 1320, and uplink control information 1325. Slots 1305 may also include guard periods 1330 for transitioning between uplink and downlink configurations. As illustrated, the UE 115 may be scheduled for simultaneous uplink and downlink communication on resources of different carriers in some symbols (e.g., symbol 1340). However, half-duplex UEs 115 may not be able to support simultaneous uplink and downlink communication. Further, if PCell 1310-*a* and SCell 1310-*b* are within the same frequency band, uplink transmissions and downlink transmissions scheduled during the same symbol period on these cells may interfere with each other (e.g., for half-duplex UEs 115 and full-duplex UEs 115). Accordingly, it may be appropriate for a wireless communications system to support techniques for preventing conflicting transmissions.

The UE 115 may support efficient techniques for coordinating with the base station 105 to prevent conflicting transmissions. In some cases, the base station 105 may establish different priorities for communication on resources of PCell 1310-*a* and for communication on resources of SCell 1310-*b*, and the base station 105 may signal this information to the UE 115. In some cases, the signaling may include an indication of a cell identity of the cell with the higher priority, and the UE 115 may prioritize communication on resources of that cell based on receiving the cell identity. The cell identity may indicate that the cell is a PCell, PSCell, or SCell. In the example of FIG. 13, the base station 105 may prioritize communication on SCell 1310-*b* (i.e., SCell driven design).

Accordingly, the UE 115 scheduled for simultaneous uplink and downlink communication may refrain from communicating on resources of PCell 1310-*b*. For example, the UE 115 may refrain from communicating during symbol 1340 of PCell 1310-*a* (e.g., refrain from monitoring for downlink data 1320), and, in some cases, the base station 105 may refrain from transmitting downlink data 1320 during symbol 1340. Similarly, the UE 115 and base station 105 may refrain from communicating during guard period 1330 of symbol 1345 of PCell 1310-*a* and refrain from transitioning to an uplink configuration until the guard period 1330 in slot 1305-*c* of SCell 1310-*b*. The process of refraining from transmitting or receiving on specific symbols may be referred to as symbol blanking, and symbol 1340 and symbols 1345 may be referred to as blanked symbols 1335.

As indicated above, the decision to communicate on specific symbols may be based on a configuration of the carrier with the higher priority. In some cases, rather than refraining from transmitting during specific symbols, the UE 115 or base station 105 may align transmissions with the prioritized cell. For example, if symbols of a prioritized cell are allocated for downlink communication, the base station 105 or UE 115 may use the corresponding symbol or symbols of another cell for downlink communication. In such cases, the UE 115 may monitor for control information on one carrier and process data on another carrier. In addition, for full-duplex UEs 115, the UE 115 may determine whether to perform symbol blanking based on whether the PCell 1310-*a* and SCell 1310-*b* are within the same frequency band (e.g., for intra-band carrier aggregation).

Although FIG. 13 illustrates an example of symbols of PCell 1310-*a* with longer durations than symbols of SCell 1310-*b*, the above techniques apply to various combinations of numerologies for different cells. For example, symbols of SCell 1310-*b* may have longer durations than symbols of PCell 1310-*a*. Further, although FIG. 13 illustrates an example of a downlink transmission scheduled on a cell during the same symbol period as an uplink transmission scheduled on another cell, the above techniques may apply to any combination of uplink transmissions, downlink transmissions, or sidelink transmissions scheduled simultaneously on resources of different cells.

Figure 14:
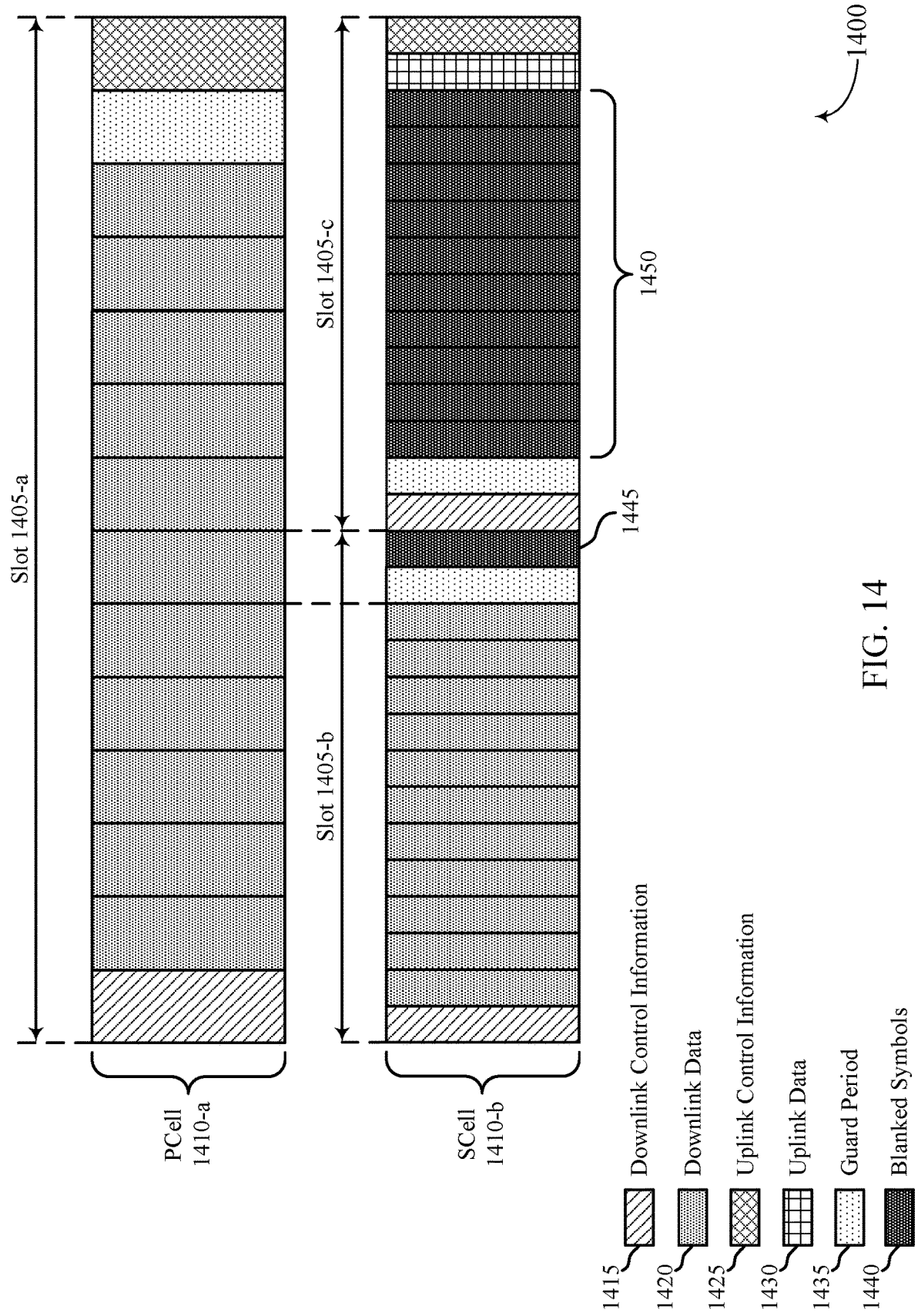

FIG. 14 illustrates an example of resources 1400 allocated for communication using carrier aggregation in a system that supports half-duplex operation in NR systems in accordance with various aspects of the present disclosure. A base station 105 may communicate with a UE 115 during slot 1405-*a* of a PCell 1410-*a* and during slots 1405-*b* and 1405-*c* of an SCell 1410-*b*. Slots 1405 may include a number of symbols each allocated for communication in a specific link direction or for transitioning between uplink, downlink, and sidelink configurations. The structure of each slot 1405 may be based on a nominal symbol period duration for symbols within the slot 1405, a numerology associated with one or more symbols within the slot 1405, a number of control symbols within the slot 1405, or a quantity of symbols of a specific link direction within the slot 1405 within a carrier or across two or more carriers. In some cases, the structure of slots 1405 used for communication on different carriers may be different. For example, symbols included in slot 1405-*a* of PCell 1410-*a* may have a longer duration than symbols included in slots 1405-*b* and 1405-*c* of SCell 1410-*b*.

Slot 1405-*a* of PCell 1410-*a* may overlap with slots 1405-*b* and 1405-*c* of SCell 1410-*b* in the time domain, and each slot 1405 may be self-contained. That is, each slot 1405 may include symbols allocated for uplink communication and symbols allocated for downlink communication. Slots 1405-*a* and 1405-*b* may be downlink centric slots, and slot 1405-*c* may be an uplink centric slot. Slots 1405-*a* and 1405-*b* may each include symbols allocated for communication of downlink control information 1415, downlink data 1420, and uplink control information 1425, and slot 1405-*c* may include symbols allocated for downlink control information 1415, uplink data 1430, and uplink control information 1425. Slots 1405 may also include guard periods 1435 for transitioning between uplink and downlink configurations.

As illustrated, the UE 115 may be scheduled for simultaneous uplink and downlink communication on resources of different carriers in some symbols (e.g., symbol 1445). However, half-duplex UEs 115 may not be able to support simultaneous uplink and downlink communication. Further, if PCell 1410-*a* and SCell 1410-*b* are within the same frequency band, uplink transmissions and downlink transmissions scheduled during the same symbol period on these cells may interfere with each other (e.g., for half-duplex UEs 115 and full-duplex UEs 115). Accordingly, it may be appropriate for a wireless communications system to support techniques for preventing conflicting transmissions.

The UE 115 may support efficient techniques for coordinating with the base station 105 to prevent conflicting transmissions. In some cases, the base station 105 may establish different priorities for communication on resources of PCell 1410-*a* and for communication on resources of SCell 1410-*b*, and the base station 105 may signal this information to the UE 115. In some cases, the signaling may include an indication of a cell identity of the cell with the higher priority, and the UE 115 may prioritize communication on resources of that cell based on receiving the cell identity. The cell identity may indicate that the cell is a PCell, PSCell, or SCell. In the example of FIG. 14, the base station 105 may prioritize communication on PCell 1410-*a* (i.e., PCell driven design).

Accordingly, the UE 115 scheduled for simultaneous uplink and downlink communication may refrain from communicating on resources of SCell 1410-*b*. For example, the UE 115 may refrain from communicating during symbol 1445 of SCell 1410-*b* (e.g., refrain from transmitting uplink control information 1425). Similarly, the UE 115 may refrain from communicating during symbols 1450 of SCell 1410-*b* (e.g., refrain from transmitting uplink data 1430). The process of refraining from transmitting or receiving on specific symbols may be referred to as symbol blanking, and symbol 1445 and symbols 1450 may be referred to as blanked symbols 1440.

As indicated above, the decision to communicate on specific symbols may be based on the configuration of the carrier with the higher priority. In some cases, rather than refraining from transmitting during specific symbols, the UE 115 or base station 105 may align transmissions with the prioritized cell. For example, if symbols of a prioritized cell are allocated for downlink communication, the base station 105 or UE 115 may use the corresponding symbol or symbols of another cell for downlink communication. In such cases, the UE 115 may monitor for control information on one carrier and process data on another carrier. In addition, for full-duplex UEs 115, the UE 115 may determine whether to perform symbol blanking based on whether the PCell 1410-*a* and SCell 1410-*b* are within the same frequency band (e.g., for intra-band carrier aggregation).

Although FIG. 14 illustrates an example of symbols of PCell 1410-*a* with longer durations than symbols of SCell 1410-*b*, the above techniques apply to various combinations of numerologies for different cells. For example, symbols of SCell 1410-*b* may have longer durations than symbols of PCell 1410-*a*. Further, although FIG. 14 illustrates an example of a downlink transmission scheduled on a cell during the same symbol period as an uplink transmission scheduled on another cell, the above techniques may apply to any combination of uplink transmissions, downlink transmissions, or sidelink transmissions scheduled simultaneously on resources of different carriers.

Figure 15:
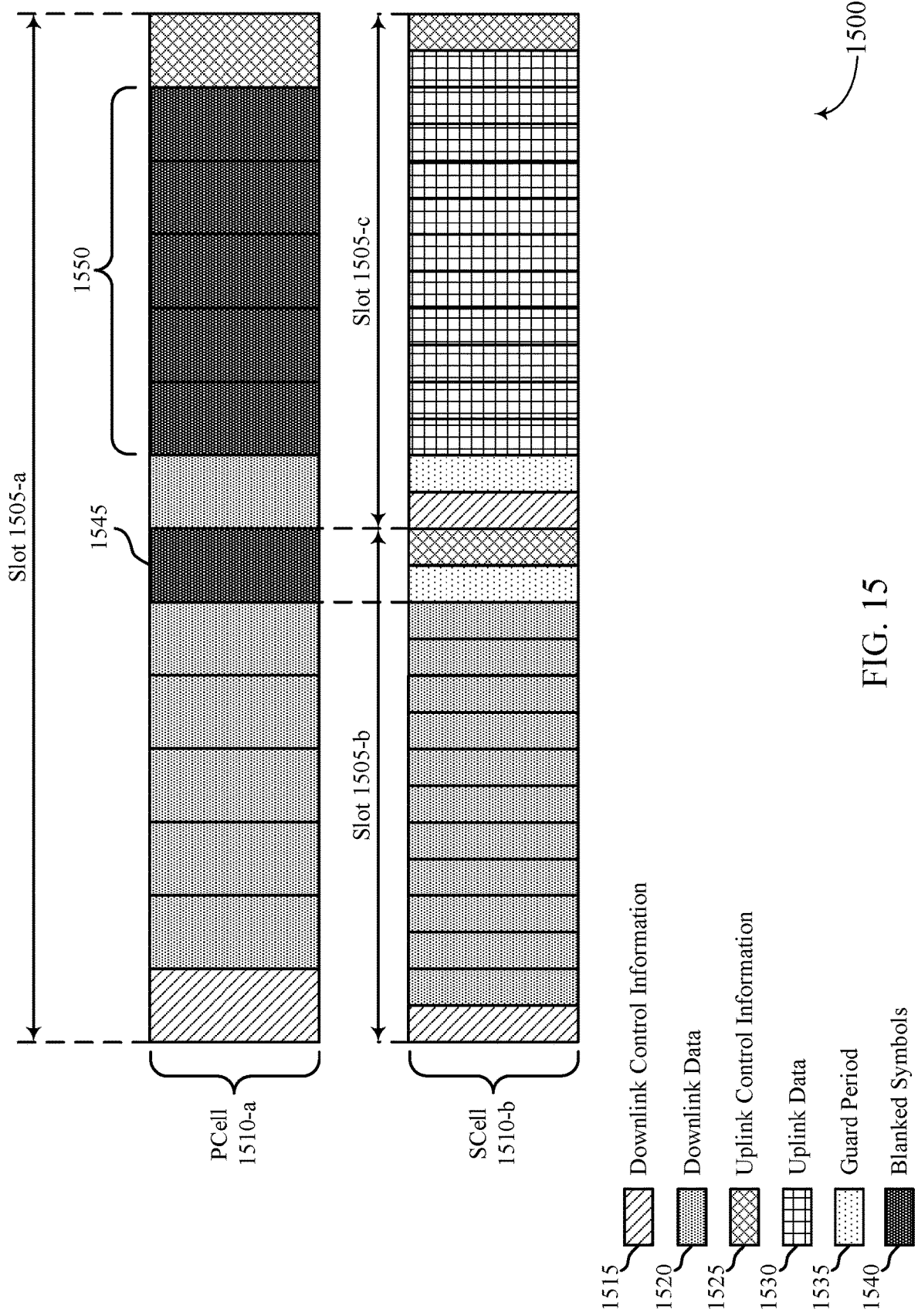

FIG. 15 illustrates an example of resources 1500 allocated for communication using carrier aggregation in a system that supports half-duplex operation in NR systems in accordance with various aspects of the present disclosure. A base station 105 may communicate with a UE 115 during slot 1505-*a* of a PCell 1510-*a* and during slots 1505-*b* and 1505-*c* of an SCell 1510-*b*. Slots 1505 may include a number of symbols each allocated for communication in a specific link direction or for transitioning between uplink, downlink, and sidelink configurations. The structure of each slot 1505 may be based on a nominal symbol period duration for symbols within the slot 1505, a numerology associated with one or more symbols within the slot 1505, a number of control symbols within the slot 1505, or a quantity of symbols of a specific link direction within the slot 1505 within a carrier or across two or more carriers. In some cases, the structure of slots 1505 used for communication on different carriers may be different. For example, symbols included in slot 1505-*a* of PCell 1510-*a* may have a longer duration than symbols included in slots 1505-*b* and 1505-*c* of SCell 1510-*b*.

Slot 1505-*a* of PCell 1510-*a* may overlap with slots 1505-*b* and 1505-*c* of SCell 1510-*b* in the time domain, and each slot 1505 may be self-contained. That is, each slot 1505 may include symbols allocated for uplink communication and symbols allocated for downlink communication. Slots 1505-*a* and 1505-*b* may be downlink centric slots, and slot 1505-*c* may be an uplink centric slot. Slots 1505-*a* and 1505-*b* may each include symbols allocated for communication of downlink control information 1515, downlink data 1520, and uplink control information 1525, and slot 1505-*c* may include symbols allocated for downlink control information 1515, uplink data 1530, and uplink control information 1525. Slots 1505 may also include guard periods 1535 for transitioning between uplink and downlink configurations.

As illustrated, the UE 115 may be scheduled for simultaneous uplink and downlink communication on resources of different carriers in some symbols (e.g., symbol 1545). However, half-duplex UEs 115 may not be able to support simultaneous uplink and downlink communication. Further, if PCell 1510-*a* and SCell 1510-*b* are within the same frequency band, uplink transmissions and downlink transmissions scheduled during the same symbol period on these cells may interfere with each other (e.g., for half-duplex UEs 115 and full-duplex UEs 115). Accordingly, it may be appropriate for a wireless communications system to support techniques for preventing conflicting transmissions.

The UE 115 may support efficient techniques for coordinating with the base station 105 to prevent conflicting transmissions. In some cases, the base station 105 may establish different priorities for communication on resources of PCell 1510-*a* and for communication on resources of SCell 1510-*b*, and the base station 105 may signal this information to the UE 115. In some cases, the signaling may include an indication of a cell identity of the cell with the higher priority, and the UE 115 may prioritize communication on resources of that cell based on receiving the cell identity. The cell identity may indicate that the cell is a PCell, PSCell, or SCell. In the example of FIG. 15, the base station 105 may prioritize communication on SCell 1510-b (i.e., SCell driven design).

Accordingly, the UE 115 scheduled for simultaneous uplink and downlink communication may refrain from communicating on resources of PCell 1510-a. For example, the UE 115 may refrain from communicating during symbol 1545 of PCell 1510-a (e.g., refrain from monitoring for downlink control information 1515). Similarly, the UE 115 may refrain from communicating during symbols 1550 of PCell 1510-a (e.g., refrain from monitoring for downlink data 1520). In some cases, the base station 105 may refrain from transmitting downlink data 1520 on symbol 1545 and symbols 1550 of PCell 1510-a. The process of refraining from transmitting or receiving on specific symbols may be referred to as symbol blanking, and symbol 1545 and symbols 1550 may be referred to as blanked symbols 1540.

As indicated above, the decision to communicate on specific symbols may be based on the configuration of the carrier with the higher priority. In some cases, rather than refraining from transmitting during specific symbols, the UE 115 or base station 105 may align transmissions with the prioritized cell. For example, if symbols of a prioritized cell are allocated for downlink communication, the base station 105 or UE 115 may use the corresponding symbol or symbols of another cell for downlink communication. In such cases, the UE 115 may monitor for control information on one carrier and process data on another carrier. In addition, for full-duplex UEs 115, the UE 115 may determine whether to perform symbol blanking based on whether the PCell 1510-a and SCell 1510-b are within the same frequency band (e.g., for intra-band carrier aggregation).

Although FIG. 15 illustrates an example of symbols of PCell 1510-a with longer durations than symbols of SCell 1510-b, the above techniques apply to various combinations of numerologies for different cells. For example, symbols of SCell 1510-b may have longer durations than symbols of PCell 1510-a. Further, although FIG. 15 illustrates an example of a downlink transmission scheduled on a cell during the same symbol period as an uplink transmission scheduled on another cell, the above techniques may apply to any combination of uplink transmissions, downlink transmissions, or sidelink transmissions scheduled simultaneously on resources of different cells.

Figure 16:
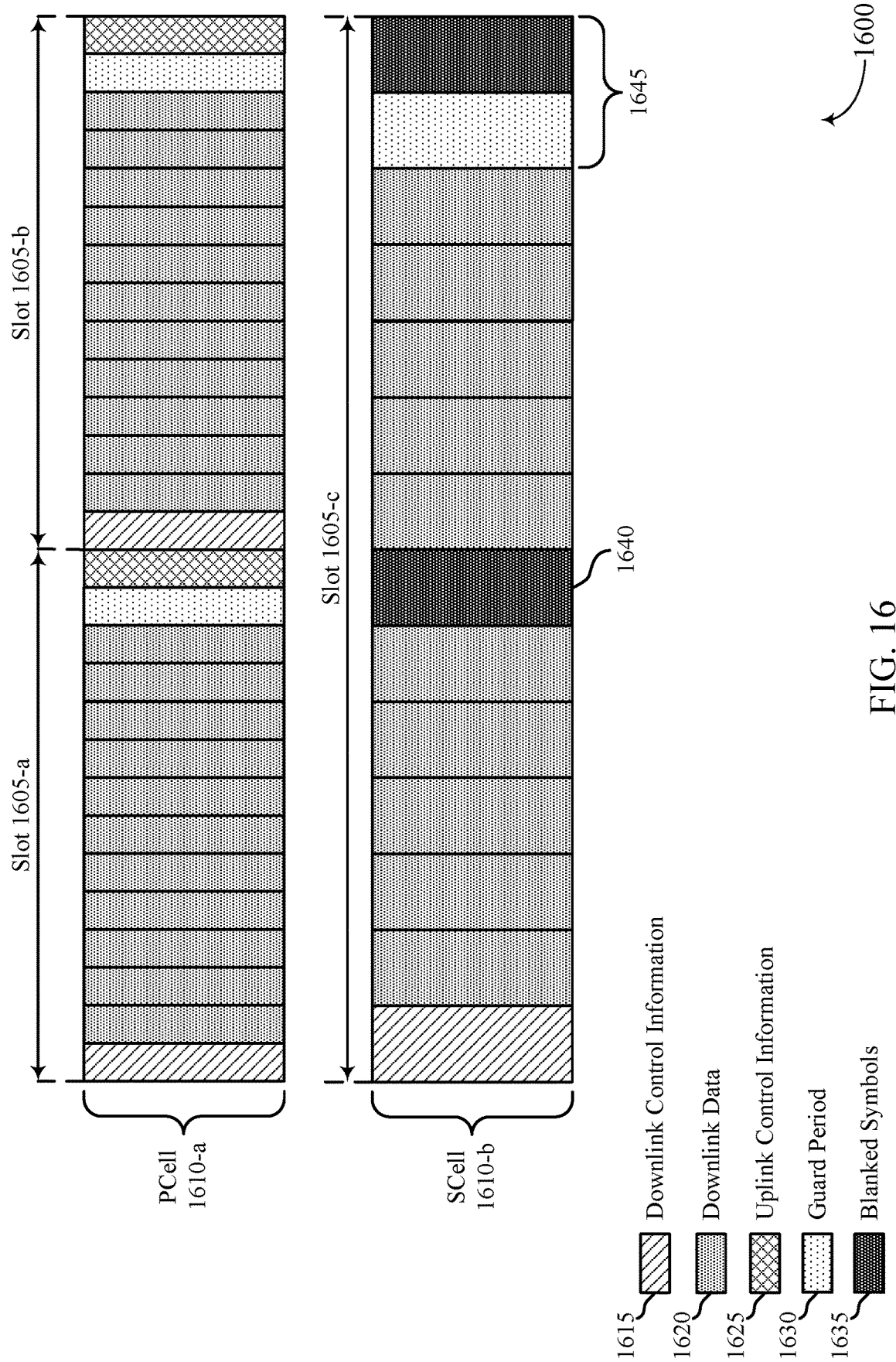

FIG. 16 illustrates an example of resources 1600 allocated for communication using carrier aggregation in a system that supports half-duplex operation in NR systems in accordance with various aspects of the present disclosure. A base station 105 may communicate with a UE 115 during slots 1605-a and 1605-b of a PCell 1610-a and during slot 1605-c of an SCell 1610-b. Slots 1605 may include a number of symbols each allocated for communication in a specific link direction or for transitioning between uplink, downlink, and sidelink configurations. The structure of each slot 1605 may be based on a nominal symbol period duration for symbols within the slot 1605, a numerology associated with one or more symbols within the slot 1605, a number of control symbols within the slot 1605, or a quantity of symbols of a specific link direction within the slot 1605 within a carrier or across two or more carriers. In some cases, the structure of slots 1605 used for communication on different carriers may be different. For example, symbols included in slots 1605-a and 1605-b of PCell 1610-a may have a shorter duration than symbols included in slot 1605-c of SCell 1610-b.

Slot 1605-c of SCell 1610-b may overlap with slots 1605-a and 1605-b of PCell 1610-a in the time domain, and each slot 1605 may be self-contained. That is, each slot 1605 may include symbols allocated for uplink communication and symbols allocated for downlink communication. Each slot 1605 may be a downlink centric slot. Specifically, slots 1605 may each include symbols allocated for communication of downlink control information 1615, downlink data 1620, and uplink control information 1625. Slots 1605 may also include guard periods 1630 for transitioning between uplink and downlink configurations. As illustrated, the UE 115 may be scheduled for simultaneous uplink and downlink communication on resources of different carriers in some symbols (e.g., symbol 1640). However, half-duplex UEs 115 may not be able to support simultaneous uplink and downlink communication. Further, if PCell 1610-a and SCell 1610-b are within the same frequency band, uplink transmissions and downlink transmissions scheduled during the same symbol period on these cells may interfere with each other (e.g., for half-duplex UEs 115 and full-duplex UEs 115). Accordingly, it may be appropriate for a wireless communications system to support techniques for preventing conflicting transmissions.

The UE 115 may support efficient techniques for coordinating with the base station 105 to prevent conflicting transmissions. In some cases, the base station 105 may establish different priorities for communication on resources of PCell 1610-a and for communication on resources of SCell 1610-b, and the base station 105 may signal this information to the UE 115. In some cases, the signaling may include an indication of a cell identity of the cell with the higher priority, and the UE 115 may prioritize communication on resources of that cell based on receiving the cell identity. The cell identity may indicate that the cell is a PCell, PSCell, or SCell. In the example of FIG. 16, the base station 105 may prioritize communication on PCell 1610-a (i.e., PCell driven design).

Accordingly, the UE 115 scheduled for simultaneous uplink and downlink communication may refrain from communicating on resources of SCell 1610-b. For example, the UE 115 may refrain from communicating during symbol 1640 of SCell 1610-b (e.g., refrain from monitoring for downlink data 1620). Similarly, the UE 115 may refrain from communicating during symbols 1645 of SCell 1610-b (e.g., refrain from transmitting uplink control information 1625). The process of refraining from transmitting or receiving on specific symbols may be referred to as symbol blanking, and symbol 1640 and symbols 1645 may be referred to as blanked symbols 1635.

As indicated above, the decision to communicate on specific symbols may be based on a configuration of the carrier with the higher priority. In some cases, rather than refraining from transmitting during specific symbols, the UE 115 or base station 105 may align transmissions with the prioritized cell. For example, if symbols of a prioritized cell are allocated for downlink communication, the base station 105 or UE 115 may use the corresponding symbol or symbols of another cell for downlink communication. In such cases, the UE 115 may monitor for control information on one carrier and process data on another carrier. In addition, for full-duplex UEs 115, the UE 115 may determine whether to perform symbol blanking based on whether the PCell 1610-a and SCell 1610-b are within the same frequency band (e.g., for intra-band carrier aggregation).

Although FIG. 16 illustrates an example of symbols of PCell 1610-*a* with shorter durations than symbols of SCell 1610-*b*, the above techniques apply to various combinations of numerologies for different cells. For example, symbols of PCell 1610-*a* may have longer durations than symbols of SCell 1610-*b*. Further, although FIG. 16 illustrates an example of a downlink transmission scheduled on a cell during the same symbol period as an uplink transmission scheduled on another cell, the above techniques may apply to any combination of uplink transmissions, downlink transmissions, or sidelink transmissions scheduled simultaneously on resources of different cells.

Figure 17:
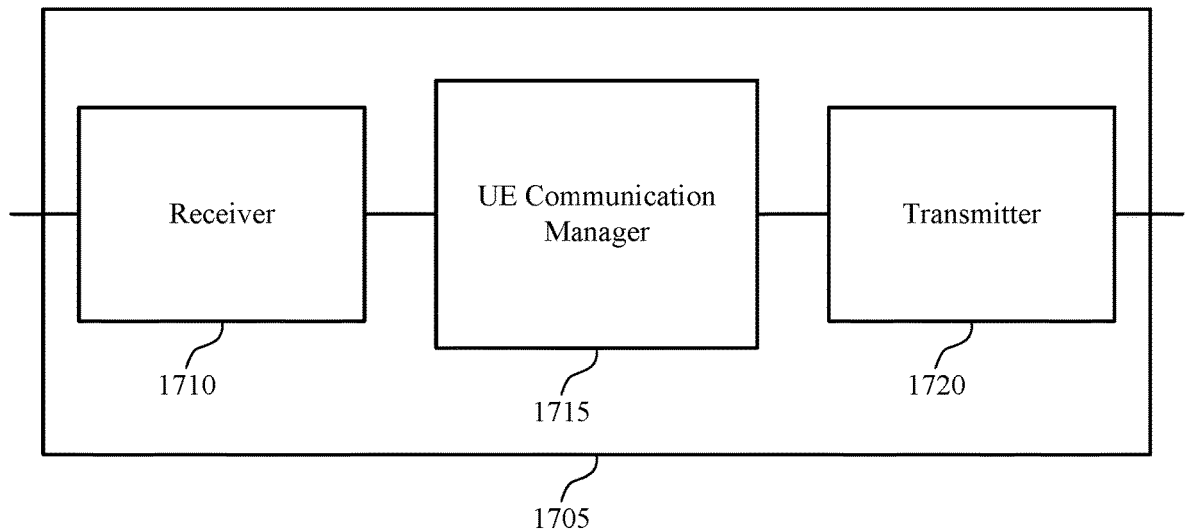
FIGS. 17-19 show block diagrams of a device or devices that support half-duplex operation in NR systems in accordance with various aspects of the present disclosure.

FIG. 17 shows a block diagram 1700 of a wireless device 1705 that supports half-duplex operation in NR systems in accordance with various aspects of the present disclosure. Wireless device 1705 may be an example of aspects of a UE 115 as described with reference to FIG. 1. Wireless device 1705 may include receiver 1710, UE communication manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to half-duplex operation in NR systems, etc.). Information may be passed on to other components of the device. The receiver 1710 may be an example of aspects of the transceiver 2035 described with reference to FIG. 20.

UE communication manager 1715 may be an example of aspects of the UE communication manager 2015 described with reference to FIG. 20. UE communication manager 1715 and/or at least some of its various sub-components may be implemented in hardware, software executed by a processor, firmware, or any combination thereof. If implemented in software executed by a processor, the functions of the UE communication manager 1715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communication manager 1715 and/or at least some of its various sub-components may be physically located at various positions, including being distributed such that portions of functions are implemented at different physical locations by one or more physical devices. In some examples, UE communication manager 1715 and/or at least some of its various sub-components may be a separate and distinct component in accordance with various aspects of the present disclosure. In other examples, UE communication manager 1715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communication manager 1715 may identify a first symbol period designated for communication in a first link direction and a second symbol period designated for communication in a second link direction, where the first symbol period is within a first slot and the second symbol period is within the first slot or a second slot, and determine a duration of a transition period between the first symbol period and the second symbol period, where the duration of the transition period is based on a structure of the first slot. UE communication manager 1715 may then coordinate with receiver 1710 and transmitter 1720 to communicate in the first link direction during the first symbol period and in the second link direction during the second symbol period. In some cases, the communication in the first link direction and the second link direction is based on a capability of the UE 115. In some cases, the UE 115 may operate in a half-duplex mode.

The UE communication manager 1715 may receive signaling from a node that indicates a carrier aggregation configuration including a first carrier and a second carrier, where a numerology or slot duration of the first carrier is different from a numerology or slot duration of the second carrier, and identify a symbol period designated for communication in a first link direction on resources of the first carrier and designated for communication in a second link direction on resources of the second carrier. UE communication manager 1715 may then coordinate with receiver 1710 and transmitter 1720 to communicate on resources of the first carrier or the second carrier during the symbol period based on a capability of the UE 115, and refrain from communicating on resources of the first carrier or the second carrier during the symbol period.

In some cases, the communication on resources of the first or second carrier may be based on a cell identity of the first carrier or the second carrier, or both. In some cases, the cell identity indicates at least one of a PCell, PSCell, or a SCell. In some cases, the communication on resources of the first or second carrier may be based on a configuration of at least one of the first carrier and the second carrier. In some cases, the first carrier and the second carrier are within a same frequency band.

Transmitter 1720 may transmit signals generated by other components of the device. In some examples, the transmitter 1720 may be collocated with a receiver 1710 in a transceiver module. For example, the transmitter 1720 may be an example of aspects of the transceiver 2035 described with reference to FIG. 20. The transmitter 1720 may include a single antenna, or it may include a set of antennas.

Figure 18:
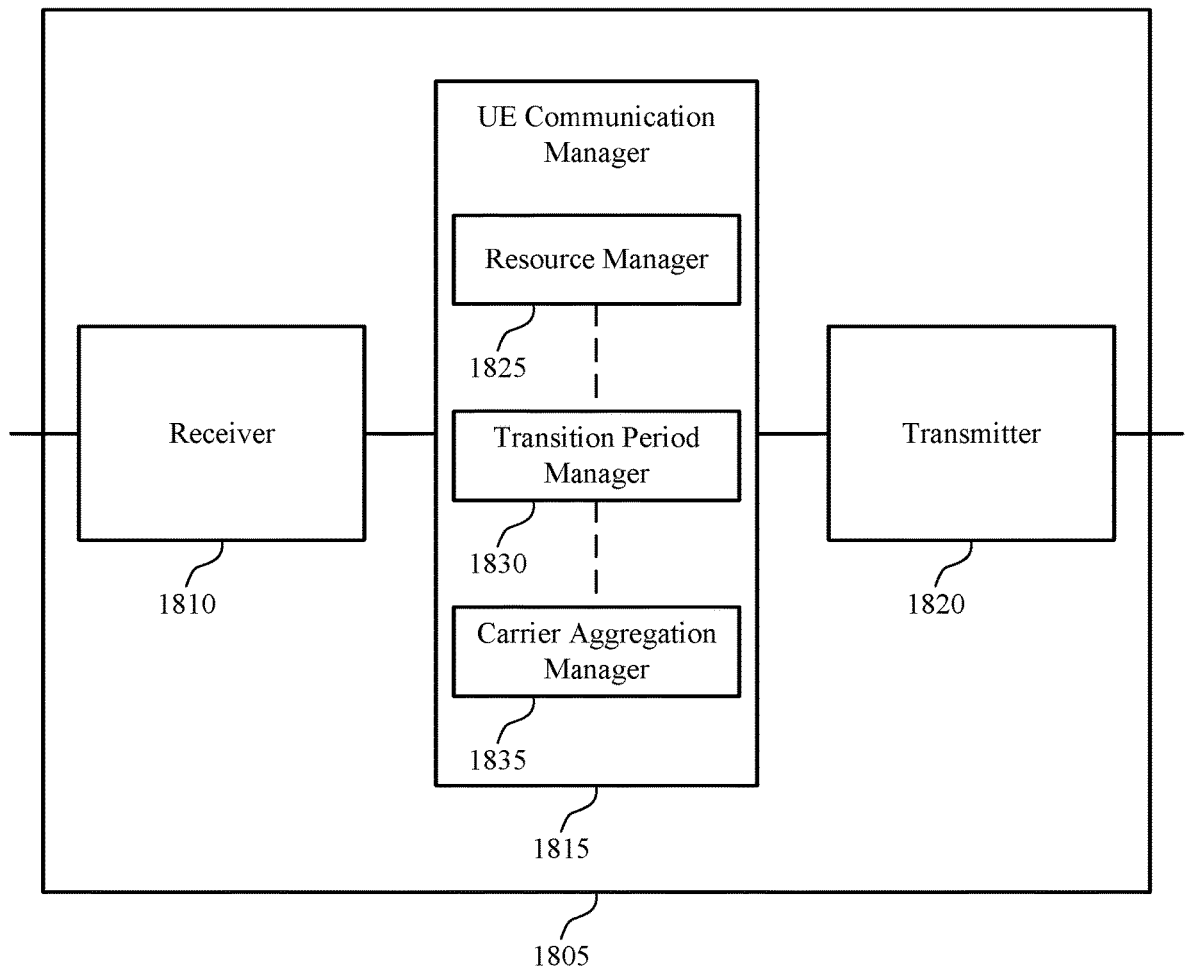

FIG. 18 shows a block diagram 1800 of a wireless device 1805 that supports half-duplex operation in NR systems in accordance with various aspects of the present disclosure. Wireless device 1805 may be an example of aspects of a wireless device 1705 or a UE 115 as described with reference to FIGS. 1 and 17. Wireless device 1805 may include receiver 1810, UE communication manager 1815, and transmitter 1820. Wireless device 1805 may also include a processor. Each of these components may be in communication with one another (e.g., via one or more buses).

Receiver 1810 may receive information such as packets, user data, or control information associated with various information channels (e.g., control channels, data channels, and information related to half-duplex operation in NR systems, etc.). Information may be passed on to other components of the device. The receiver 1810 may be an example of aspects of the transceiver 2035 described with reference to FIG. 20.

UE communication manager 1815 may be an example of aspects of the UE communication manager 2015 described with reference to FIG. 20. UE communication manager 1815 may include resource manager 1825, transition period manager 1830, and carrier aggregation manager 1835.

Resource manager 1825 may identify a first symbol period designated for communication in a first link direction and a second symbol period designated for communication in a second link direction, where the first symbol period is within a first slot and the second symbol period is within the first slot or a second slot. In some cases, the first link direction includes one of a downlink, an uplink, or a sidelink, and the second link direction includes one of a downlink, an uplink, or a sidelink, and is different from the first link direction. In some cases, the first slot includes one slot of a set of adjacent slots each designated for communication in the first link direction.

Transition period manager 1830 may determine a duration of a transition period between the first symbol period and the second symbol period, where the duration of the transition period is based on a structure of the first slot. In some cases, the duration of the transition period may include one or more symbol periods, and transition period manager 1830 may coordinate with receiver 1810 and transmitter 1820 to refrain from communicating during the one or more symbol periods. In some cases, the structure of the first slot includes at least one of a nominal symbol period duration for symbols within the first slot, a numerology associated with one or more symbols within the first slot, a number of control symbols within the first slot, or a quantity of symbols of a link direction within the first slot within a carrier or across two or more carriers.

Additionally, UE communication manager 1815 may coordinate with receiver 1810 and transmitter 1820 to communicate in the first link direction during the first symbol period and in the second link direction during the second symbol period. In some cases, the communication in the first link direction and the second link direction is based on a capability of the UE 115. In some cases, the UE 115 may operate in a half-duplex mode.

Carrier aggregation manager 1835 may receive signaling from a node that indicates a carrier aggregation configuration including a first carrier and a second carrier, where a numerology or slot duration of the first carrier is different from a numerology or slot duration of the second carrier.

Resource manager 1825 may identify a symbol period designated for communication in a first link direction on resources of the first carrier and designated for communication in a second link direction on resources of the second carrier. In some cases, the first link direction includes one of a downlink, an uplink, or a sidelink, and the second link direction includes one of a downlink, an uplink or a sidelink, and is different from the first link direction.

Further, UE communication manager 1815 may coordinate with receiver 1810 and transmitter 1820 to communicate on resources of the first carrier or the second carrier during the symbol period based on a capability of the UE 115 and refrain from communicating on resources of the first carrier or the second carrier during the symbol period. In some cases, the communication on resources of the first or second carrier may be based on a cell identity of the first carrier or the second carrier, or both. In some cases, the cell identity indicates at least one of a PCell, PSCell, or a SCell. In some cases, the communication on resources of the first or second carrier may be based on a configuration of at least one of the first carrier and the second carrier. In some cases, the first carrier and the second carrier are within a same frequency band.

Transmitter 1820 may transmit signals generated by other components of the device. In some examples, the transmitter 1820 may be collocated with a receiver 1810 in a transceiver module. For example, the transmitter 1820 may be an example of aspects of the transceiver 2035 described with reference to FIG. 20. The transmitter 1820 may include a single antenna, or it may include a set of antennas.

Figure 19:
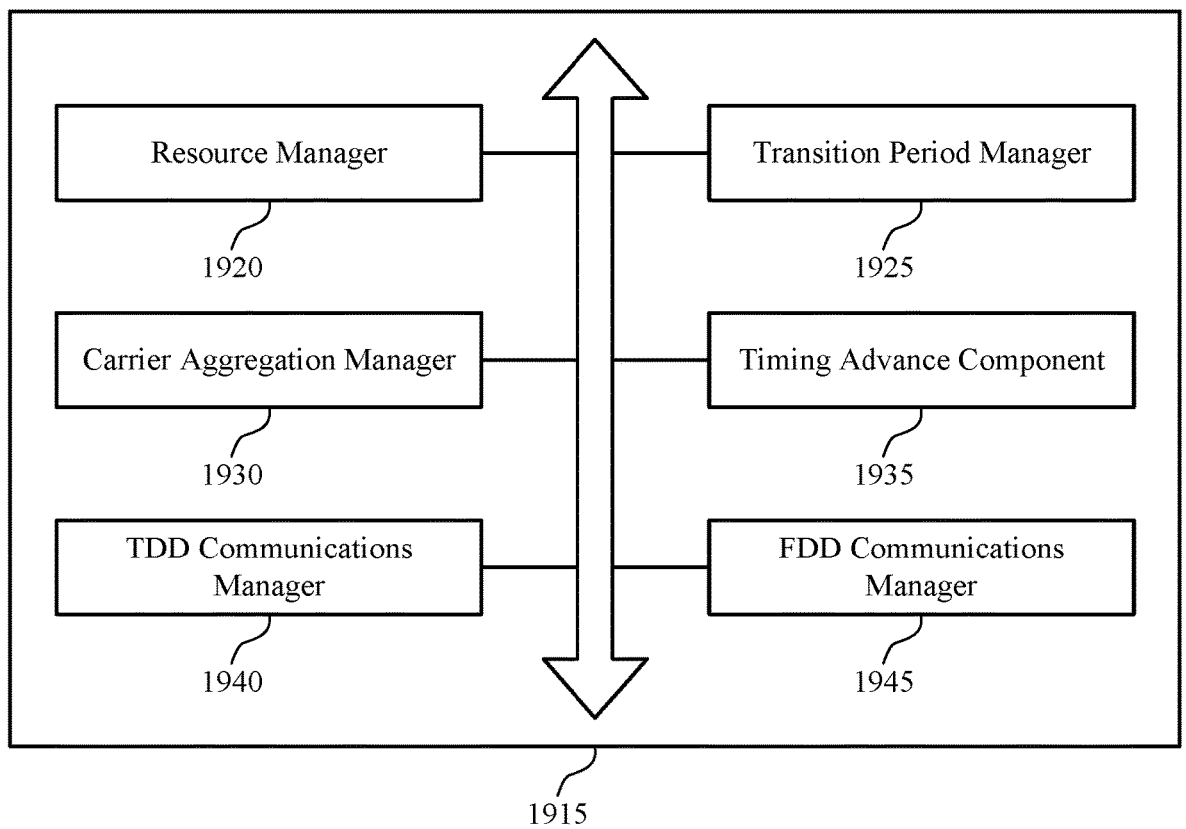

FIG. 19 shows a block diagram 1900 of a UE communication manager 1915 that supports half-duplex operation in NR systems in accordance with various aspects of the present disclosure. The UE communication manager 1915 may be an example of aspects of a UE communication manager 1715, a UE communication manager 1815, or a UE communication manager 2015 described with reference to FIGS. 17, 18, and 20. The UE communication manager 1915 may include resource manager 1920, transition period manager 1925, carrier aggregation manager 1930, timing advance component 1935, TDD communications manager 1940, and FDD communications manager 1945. Each of these modules may communicate, directly or indirectly, with one another (e.g., via one or more buses).

Resource manager 1920 may identify a first symbol period designated for communication in a first link direction and a second symbol period designated for communication in a second link direction, where the first symbol period is within a first slot and the second symbol period is within the first slot or a second slot. In some cases, the first link direction includes one of a downlink, an uplink, or a sidelink, and the second link direction includes one of a downlink, an uplink, or a sidelink, and is different from the first link direction. In some cases, the first slot includes one slot of a set of adjacent slots each designated for communication in the first link direction.

Transition period manager 1925 may determine a duration of a transition period between the first symbol period and the second symbol period, where the duration of the transition period is based on a structure of the first slot. In some cases, the duration of the transition period may include one or more symbol periods, and transition period manager 1925 may coordinate with a receiver and transmitter to refrain from communicating during the one or more symbol periods. In some cases, the structure of the first slot includes at least one of a nominal symbol period duration for symbols within the first slot, a numerology associated with one or more symbols within the first slot, a number of control symbols within the first slot, or a quantity of symbols of a link direction within the first slot within a carrier or across two or more carriers.

Additionally, UE communication manager 1915 may coordinate with a receiver and transmitter to communicate in the first link direction during the first symbol period and in the second link direction during the second symbol period. In some cases, the communication in the first link direction and the second link direction is based on a capability of a UE 115. In some cases, the UE 115 may operate in a half-duplex mode. In some cases, TDD communications manager 1940 may coordinate with a receiver and transmitter to communicate during the first symbol period and the second symbol period on resources of the same carrier. In other cases, FDD communications manager 1945 may coordinate with a receiver and transmitter to communicate during the first symbol period on resources of a first carrier and during the second symbol period on resources of a second carrier.

Timing advance component 1935 may identify a timing advance associated with the first symbol period and coordinate with a transmitter and receiver to communicate during the first symbol period based on the timing advance. In some cases, the timing advance is based on a numerology of the first slot. In some cases, timing advance component 1935 may receive the timing advance associated with the first symbol period in one of a MIB, SIB, or an RRC message.

Carrier aggregation manager 1930 may receive signaling from a node that indicates a carrier aggregation configuration including a first carrier and a second carrier, where a numerology or slot duration of the first carrier is different from a numerology or slot duration of the second carrier.

Resource manager 1825 may identify a symbol period designated for communication in a first link direction on resources of the first carrier and designated for communication in a second link direction on resources of the second carrier. In some cases, the first link direction includes one of a downlink, an uplink, or a sidelink, and the second link direction includes one of a downlink, an uplink or a sidelink, and is different from the first link direction.

Further, UE communication manager 1915 may coordinate with a receiver and transmitter to communicate on resources of the first carrier or the second carrier during the symbol period based on a capability of the UE 115, and refrain from communicating on resources of the first carrier or the second carrier during the symbol period. In some cases, the communication on resources of the first or second carrier may be based on a cell identity of the first carrier or the second carrier, or both. In some cases, the cell identity indicates at least one of a PCell, PSCell, or a SCell. In some cases, the communication on resources of the first or second carrier may be based on a configuration of at least one of the first carrier and the second carrier. In some cases, the first carrier and the second carrier are within a same frequency band.

Figure 20:
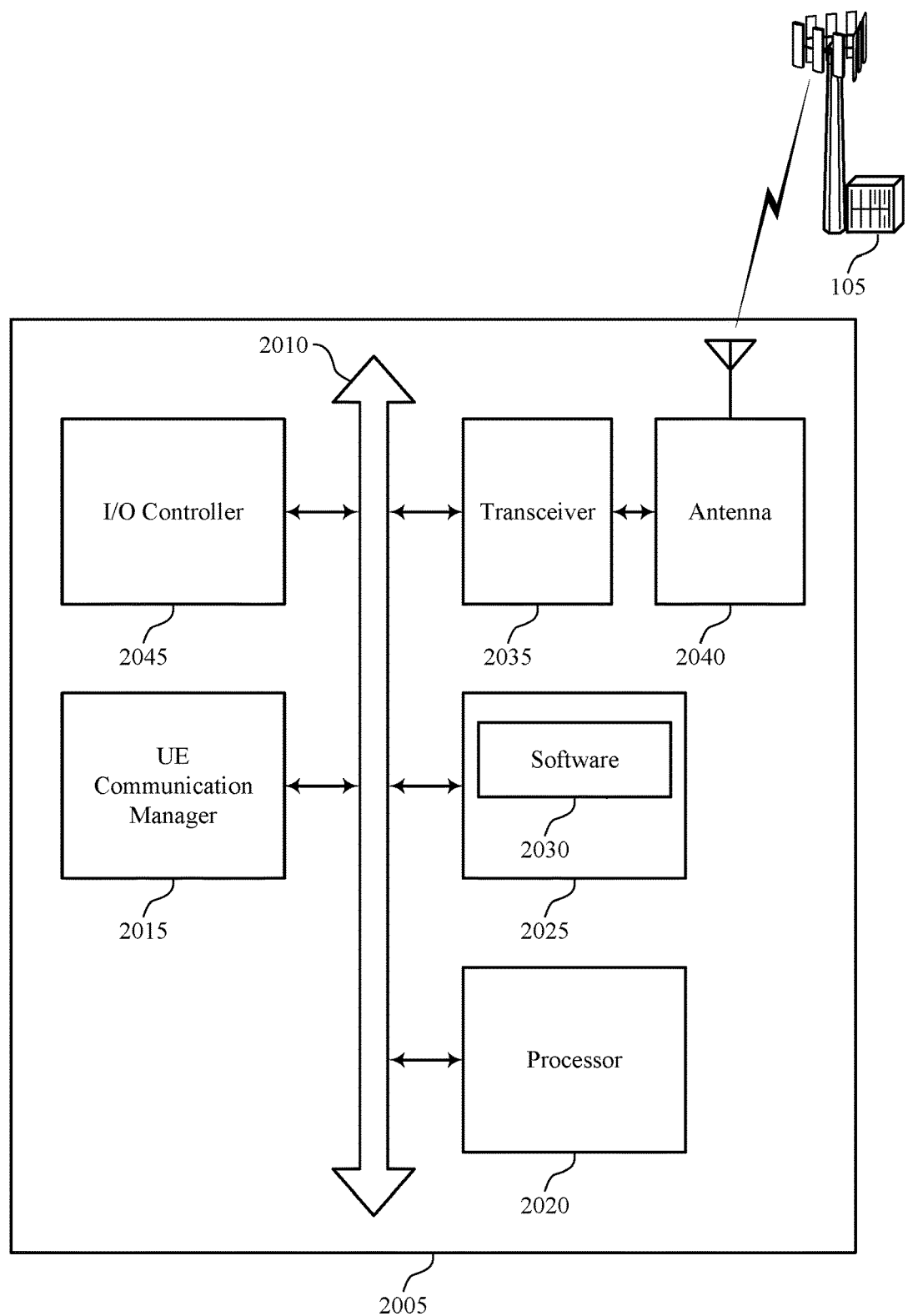
FIG. 20 illustrates a block diagram of a system including a device that supports half-duplex operation in NR systems in accordance with various aspects of the present disclosure.

FIG. 20 shows a diagram of a system 2000 including a device 2005 that supports half-duplex operation in NR systems in accordance with various aspects of the present disclosure. Device 2005 may be an example of or include the components of wireless device 1705, wireless device 1805, or a UE 115 as described above, e.g., with reference to FIGS. 1, 17 and 18. Device 2005 may include components for bi-directional voice and data communications including components for transmitting and receiving communications, including UE communication manager 2015, processor 2020, memory 2025, software 2030, transceiver 2035, antenna 2040, and I/O controller 2045. These components may be in electronic communication via one or more busses (e.g., bus 2010). Device 2005 may communicate wirelessly with one or more base stations 105.

Processor 2020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 2020 may be configured to operate a memory array using a memory controller. In other cases, a memory controller may be integrated into processor 2020. Processor 2020 may be configured to execute computer-readable instructions stored in a memory to perform various functions (e.g., functions or tasks supporting half-duplex operation in NR systems).

Memory 2025 may include random access memory (RAM) and read only memory (ROM). The memory 2025 may store computer-readable, computer-executable software 2030 including instructions that, when executed, cause the processor to perform various functions described herein. In some cases, the memory 2025 may contain, among other things, a basic input/output system (BIOS) which may control basic hardware and/or software operation such as the interaction with peripheral components or devices.

Software 2030 may include code to implement aspects of the present disclosure, including code to support half-duplex operation in NR systems. Software 2030 may be stored in a non-transitory computer-readable medium such as system memory or other memory. In some cases, the software 2030 may not be directly executable by the processor but may cause a computer (e.g., when compiled and executed) to perform functions described herein.

Transceiver 2035 may communicate bi-directionally, via one or more antennas, wired, or wireless links as described above. For example, the transceiver 2035 may represent a wireless transceiver and may communicate bi-directionally with another wireless transceiver. The transceiver 2035 may also include a modem to modulate the packets and provide the modulated packets to the antennas for transmission, and to demodulate packets received from the antennas.

In some cases, the wireless device may include a single antenna 2040. However, in some cases the device may have more than one antenna 2040, which may be capable of concurrently transmitting or receiving multiple wireless transmissions.

I/O controller 2045 may manage input and output signals for device 2005. I/O controller 2045 may also manage peripherals not integrated into device 2005. In some cases, I/O controller 2045 may represent a physical connection or port to an external peripheral. In some cases, I/O controller 2045 may utilize an operating system such as iOS®, ANDROID®, MS-DOS®, MS-WINDOWS®, OS/2®, UNIX®, LINUX®, or another known operating system. In other cases, I/O controller 2045 may represent or interact with a modem, a keyboard, a mouse, a touchscreen, or a similar device. In some cases, I/O controller 2045 may be implemented as part of a processor. In some cases, a user may interact with device 2005 via I/O controller 2045 or via hardware components controlled by I/O controller 2045.

Figure 21:
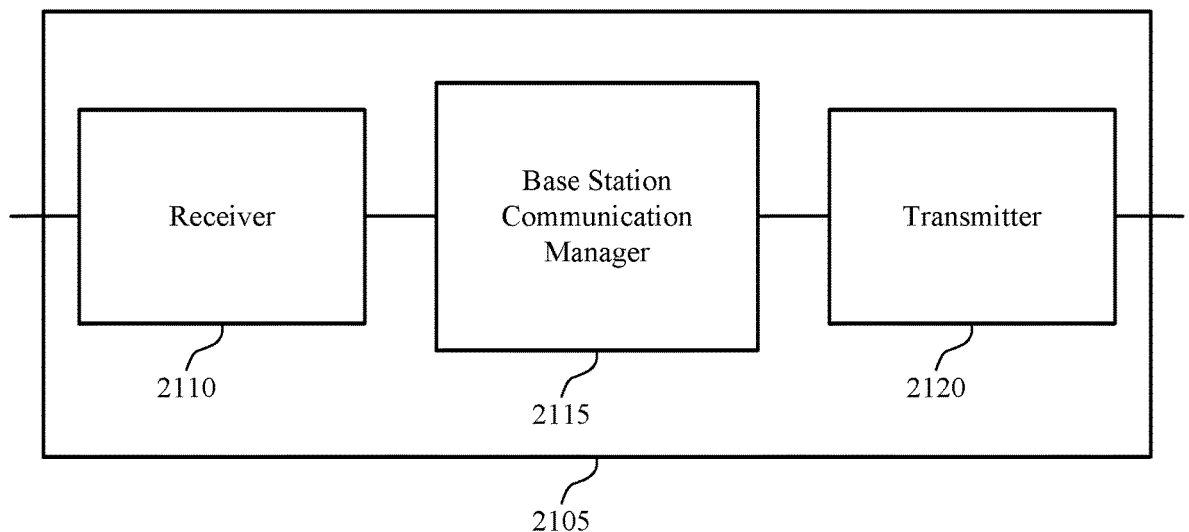
FIGS. 21-23 show block diagrams of a device or devices that support half-duplex operation in NR systems in accordance with various aspects of the present disclosure.

FIG. 21 shows a block diagram 2100 of a wireless device 2105 that supports half-duplex operation in NR systems in accordance with various aspects of the present disclosure. Wireless device 2105 may be an example of aspects of a base station 105 as described with reference to FIG. 1. Wireless device 2105 may include receiver 2110, base station communication manager 2115, and transmitter 2120. Wireless device 2105 may also include a processor. Each of these components may be in communication with one another (e.g., via one or more buses).

Receiver 2110 may receive information such as packets, user data, or control information associated with various information channels (e.g., control channels, data channels, and information related to half-duplex operation in NR systems, etc.). Information may be passed on to other components of the device. The receiver 2110 may be an example of aspects of the transceiver 2435 described with reference to FIG. 24.

Base station communication manager 2115 may be an example of aspects of the base station communication manager 2415 described with reference to FIG. 24. Base station communication manager 2115 and/or at least some of its various sub-components may be implemented in hardware, software executed by a processor, firmware, or any combination thereof. If implemented in software executed by a processor, the functions of the base station communication manager 2115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communication manager 2115 and/or at least some of its various sub-components may be physically located at various positions, including being distributed such that portions of functions are implemented at different physical locations by one or more physical devices. In some examples, base station communication manager 2115 and/or at least some of its various sub-components may be a separate and distinct component in accordance with various aspects of the present disclosure. In other examples, base station communication manager 2115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communication manager 2115 may identify a first symbol period designated for communication in a first link direction and a second symbol period designated for communication in a second link direction, where the first symbol period is within a first slot and the second symbol period is within the first slot or a second slot, and determine a duration of a transition period between the first symbol period and the second symbol period, where the duration of the transition period is based on a structure of the first slot. Base station communication manager 2115 may coordinate with receiver 2110 and transmitter 2120 to communicate in the first link direction during the first symbol period and in the second link direction during the second symbol period.

The base station communication manager 2115 may transmit signaling to a UE 115 that indicates a carrier aggregation configuration including a first carrier and a second carrier, where a numerology or slot duration of the first carrier is different from a numerology or slot duration of the second carrier, and identify a symbol period designated for communication in a first link direction on resources of the first carrier and designated for communication in a second link direction on resources of the second carrier. Base station communication manager 2115 may coordinate with receiver 2110 and transmitter 2120 to communicate on resources of the first carrier or the second carrier during the symbol period based on a capability of the UE 115 and refrain from communicating on resources of the first carrier or the second carrier during the symbol period.

In some cases, the UE 115 may operate in a half-duplex mode. In some cases, the communication on resources of the first carrier or the second carrier during the symbol period may be based on a cell identity of the first carrier or the second carrier. In some cases, the cell identify indicates at least one of a PCell, PSCell, or an SCell. In some cases, the communication on resources of the first carrier or the second carrier during the symbol period is based on a configuration of at least one of the first carrier and the second carrier. In some cases, the first carrier and the second carrier are within a same frequency band.

Transmitter 2120 may transmit signals generated by other components of the device. In some examples, the transmitter 2120 may be collocated with a receiver 2110 in a transceiver module. For example, the transmitter 2120 may be an example of aspects of the transceiver 2435 described with reference to FIG. 24. The transmitter 2120 may include a single antenna, or it may include a set of antennas.

Figure 22:
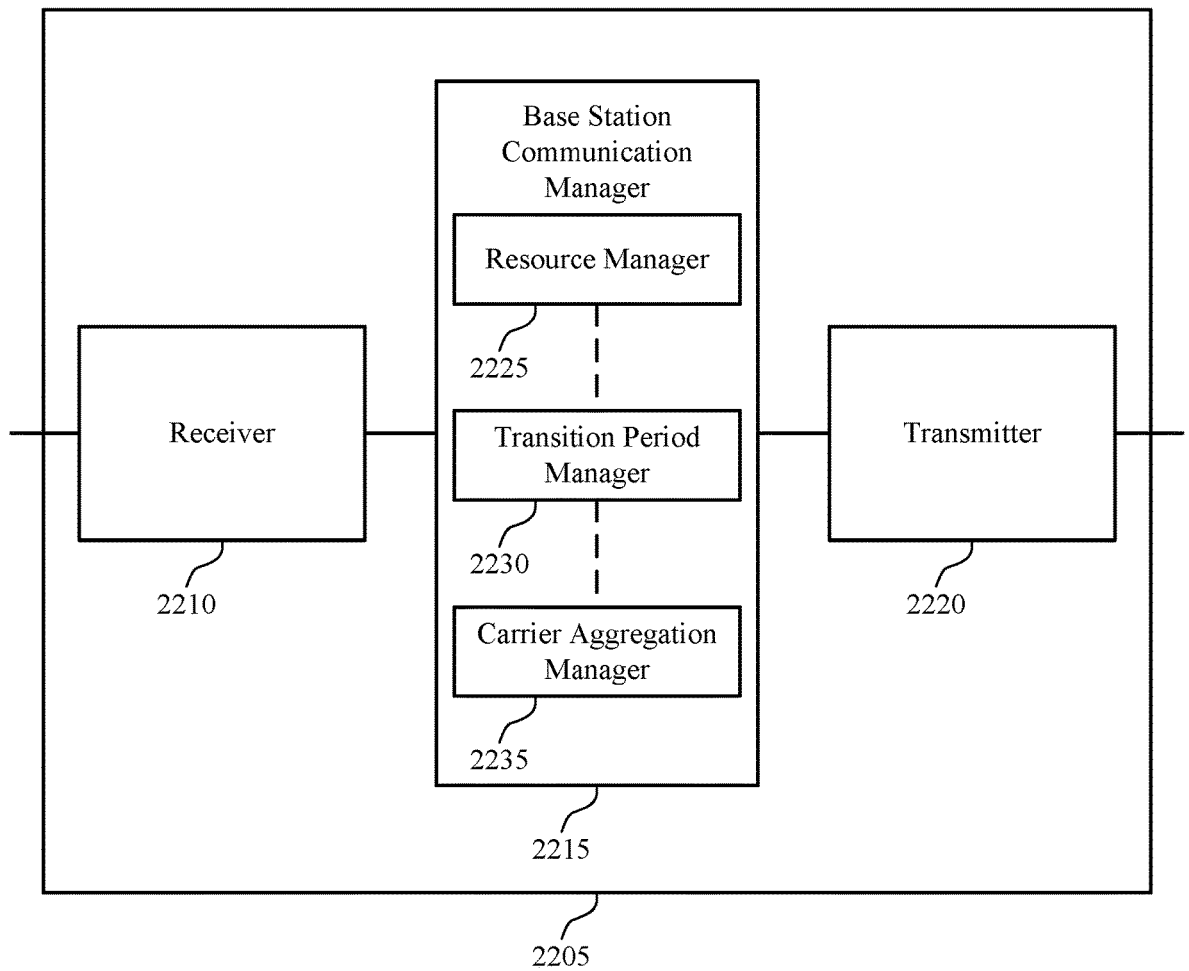

FIG. 22 shows a block diagram 2200 of a wireless device 2205 that supports half-duplex operation in NR systems in accordance with various aspects of the present disclosure. Wireless device 2205 may be an example of aspects of a wireless device 2105 or a base station 105 as described with reference to FIGS. 1 and 21. Wireless device 2205 may include receiver 2210, base station communication manager 2215, and transmitter 2220. Wireless device 2205 may also include a processor. Each of these components may be in communication with one another (e.g., via one or more buses).

Receiver 2210 may receive information such as packets, user data, or control information associated with various information channels (e.g., control channels, data channels, and information related to half-duplex operation in NR systems, etc.). Information may be passed on to other components of the device. The receiver 2210 may be an example of aspects of the transceiver 2435 described with reference to FIG. 24.

Base station communication manager 2215 may be an example of aspects of the base station communication manager 2415 described with reference to FIG. 24. Base station communication manager 2215 may include resource manager 2225, transition period manager 2230, and carrier aggregation manager 2235.

Resource manager 2225 may identify a first symbol period designated for communication in a first link direction and a second symbol period designated for communication in a second link direction, where the first symbol period is within a first slot and the second symbol period is within the first slot or a second slot. In some cases, the first link direction includes one of a downlink, an uplink, or a sidelink, and the second link direction includes one of a downlink, an uplink, or a sidelink, and is different from the first link direction. In some cases, the first slot includes one slot of a set of adjacent slots each designated for communication in the first link direction.

Transition period manager 2230 may determine a duration of a transition period between the first symbol period and the second symbol period, where the duration of the transition period is based on a structure of the first slot. In some cases, the duration of the transition period may include one or more symbol periods, and transition period manager 2230 may coordinate with receiver 2210 and transmitter 2220 to refrain from communicating during the one or more symbol periods. In some cases, the structure of the first slot includes at least one of a nominal symbol period duration for symbols within the first slot, a numerology associated with one or more symbols within the first slot, a number of control symbols within the first slot, or a quantity of symbols of a link direction within the first slot within a carrier or across two or more carriers, or both.

Base station communication manager 2215 may coordinate with receiver 2210 and transmitter 2220 to communicate in the first link direction during the first symbol period and in the second link direction during the second symbol period.

Carrier aggregation manager 2235 may transmit signaling to a UE 115 that indicates a carrier aggregation configuration including a first carrier and a second carrier, where a numerology or slot duration of the first carrier is different from a numerology or slot duration of the second carrier.

Resource manager 2225 may identify a symbol period designated for communication in a first link direction on resources of the first carrier and designated for communication in a second link direction on resources of the second carrier. In some cases, the first link direction includes one of a downlink, an uplink, or a sidelink, and the second link direction includes one of a downlink, an uplink, or a sidelink, and is different from the first link direction.

Base station communication manager 2215 may coordinate with receiver 2210 and transmitter 2220 to communicate on resources of the first carrier or the second carrier during the symbol period based on a capability of the UE 115 and refrain from communicating on resources of the first carrier or the second carrier during the symbol period. In some cases, the UE 115 may operate in a half-duplex mode. In some cases, the communication on resources of the first carrier or the second carrier during the symbol period may be based on a cell identity of the first carrier or the second carrier. In some cases, the cell identify indicates at least one of a PCell, PSCell, or an SCell. In some cases, the communication on resources of the first carrier or the second carrier during the symbol period is based on a configuration of at least one of the first carrier and the second carrier. In some cases, the first carrier and the second carrier are within a same frequency band.

Transmitter 2220 may transmit signals generated by other components of the device. In some examples, the transmitter 2220 may be collocated with a receiver 2210 in a transceiver module. For example, the transmitter 2220 may be an example of aspects of the transceiver 2435 described with reference to FIG. 24. The transmitter 2220 may include a single antenna, or it may include a set of antennas.

Figure 23:
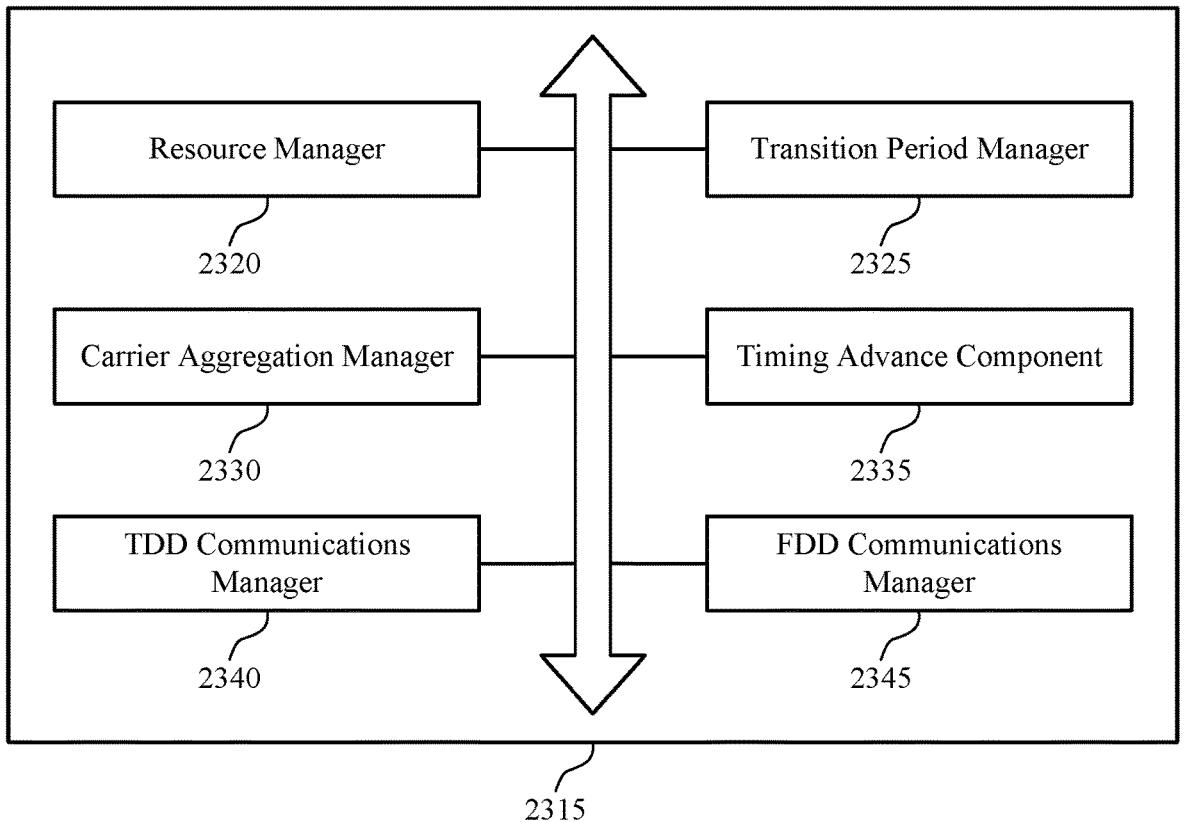

FIG. 23 shows a block diagram 2300 of a base station communication manager 2315 that supports half-duplex operation in NR systems in accordance with various aspects of the present disclosure. The base station communication manager 2315 may be an example of aspects of a base station communication manager 2415 described with reference to FIGS. 21, 22, and 24. The base station communication manager 2315 may include resource manager 2320, transition period manager 2325, carrier aggregation manager 2330, timing advance component 2335, TDD communications manager 2340, and FDD communications manager 2345. Each of these modules may communicate, directly or indirectly, with one another (e.g., via one or more buses).

Resource manager 2320 may identify a first symbol period designated for communication in a first link direction and a second symbol period designated for communication in a second link direction, where the first symbol period is within a first slot and the second symbol period is within the first slot or a second slot. In some cases, the first link direction includes one of a downlink, an uplink, or a sidelink, and the second link direction includes one of a downlink, an uplink, or a sidelink, and is different from the first link direction. In some cases, the first slot includes one slot of a set of adjacent slots each designated for communication in the first link direction.

Transition period manager 2325 may determine a duration of a transition period between the first symbol period and the second symbol period, where the duration of the transition period is based on a structure of the first slot. In some cases, the duration of the transition period may include one or more symbol periods, and transition period manager 2325 may coordinate with a receiver and transmitter to refrain from communicating during the one or more symbol periods. In some cases, the structure of the first slot includes at least one of a nominal symbol period duration for symbols within the first slot, a numerology associated with one or more symbols within the first slot, a number of control symbols within the first slot, or a quantity of symbols of a link direction within the first slot within a carrier or across two or more carriers, or both.

Base station communication manager 2315 may coordinate with a receiver and transmitter to communicate in the first link direction during the first symbol period and in the second link direction during the second symbol period. In some cases, TDD communications manager 2340 may coordinate with the receiver and transmitter to communicate during the first symbol period and the second symbol period on resources of a same carrier. In other cases, FDD communications manager 2345 may coordinate with the receiver and transmitter to communicate during the first symbol period on resources of a first carrier and during the second symbol period on resources of a second carrier.

Timing advance component 2335 may identify a timing advance associated with the first symbol period and coordinate with a transmitter or receiver to communicate during the first symbol period based on the timing advance. In some cases, the timing advance is based on a numerology of the first slot. In some cases, timing advance component 2335 may transmit the timing advance associated with the first symbol period in one of a MIB, SIB, or an RRC message.

Carrier aggregation manager 2330 may transmit signaling to a UE 115 that indicates a carrier aggregation configuration including a first carrier and a second carrier, where a numerology or slot duration of the first carrier is different from a numerology or slot duration of the second carrier.

Resource manager 2320 may identify a symbol period designated for communication in a first link direction on resources of the first carrier and designated for communication in a second link direction on resources of the second carrier. In some cases, the first link direction includes one of a downlink, an uplink, or a sidelink, and the second link direction includes one of a downlink, an uplink, or a sidelink, and is different from the first link direction.

Base station communication manager 2315 may coordinate with a receiver and transmitter to communicate on resources of the first carrier or the second carrier during the symbol period based on a capability of the UE 115 and refrain from communicating on resources of the first carrier or the second carrier during the symbol period. In some cases, the UE 115 may operate in a half-duplex mode. In some cases, the communication on resources of the first carrier or the second carrier during the symbol period may be based on a cell identity of the first carrier or the second carrier. In some cases, the cell identify indicates at least one of a PCell, PSCell, or an SCell. In some cases, the communication on resources of the first carrier or the second carrier during the symbol period is based on a configuration of at least one of the first carrier and the second carrier. In some cases, the first carrier and the second carrier are within a same frequency band.

Figure 24:
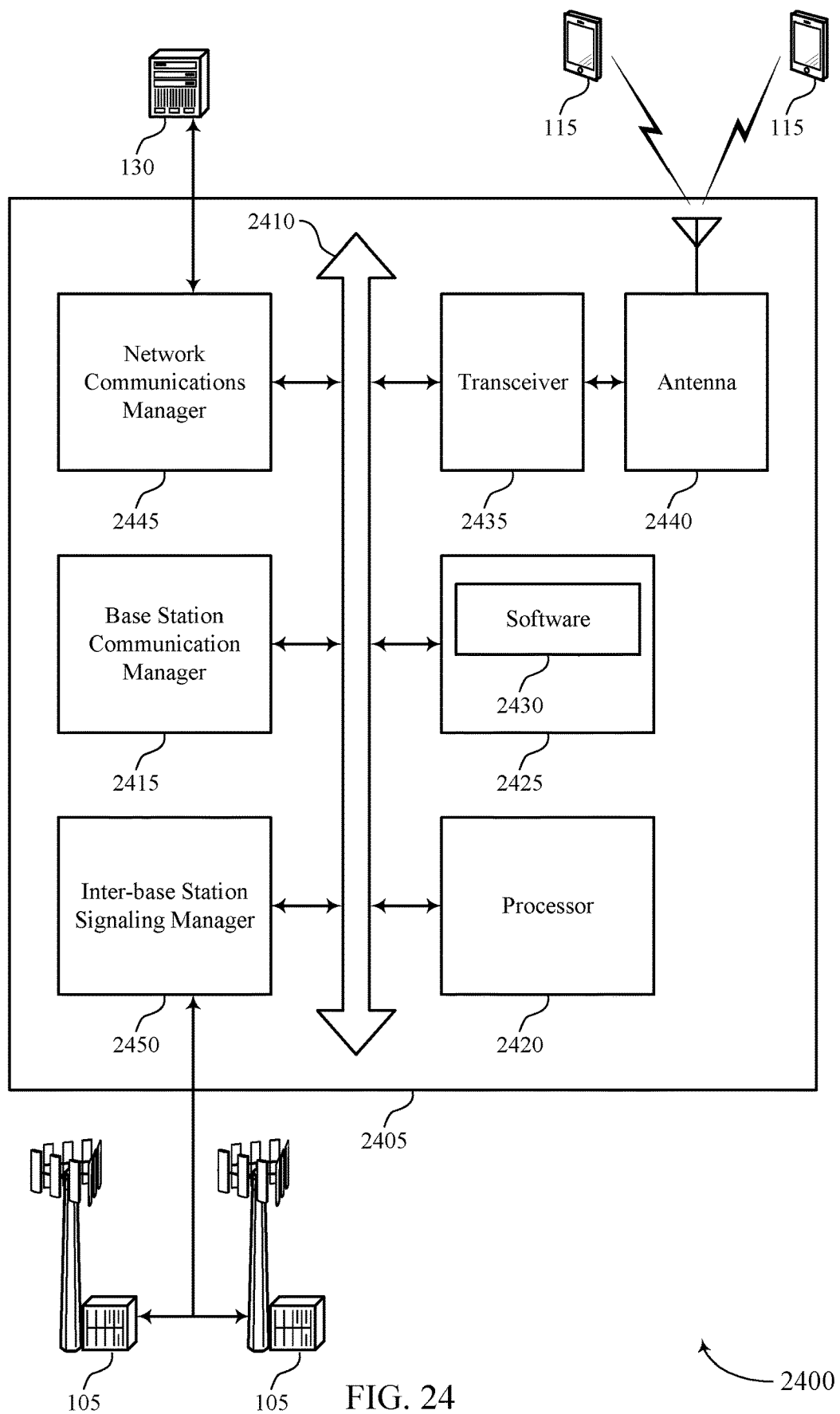
FIG. 24 illustrates a block diagram of a system including a device, such as a base station, that supports half-duplex operation in NR systems in accordance with various aspects of the present disclosure.

FIG. 24 shows a diagram of a system 2400 including a device 2405, such as a base station, that supports half-duplex operation in NR systems in accordance with various aspects of the present disclosure. Device 2405 may be an example of or include the components of base station 105 as described above, e.g., with reference to FIG. 1. Device 2405 may include components for bi-directional voice and data communications including components for transmitting and receiving communications, including base station communication manager 2415, processor 2420, memory 2425, software 2430, transceiver 2435, antenna 2440, network communications manager 2445, and inter-base station signaling manager 2450. These components may be in electronic communication via one or more busses (e.g., bus 2410). Device 2405 may communicate wirelessly with one or more UEs 115.

Processor 2420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2420 may be configured to operate a memory array using a memory controller. In other cases, a memory controller may be integrated into processor 2420. Processor 2420 may be configured to execute computer-readable instructions stored in a memory to perform various functions (e.g., functions or tasks supporting half-duplex operation in NR systems).

Memory 2425 may include RAM and ROM. The memory 2425 may store computer-readable, computer-executable software 2430 including instructions that, when executed, cause the processor to perform various functions described herein. In some cases, the memory 2425 may contain, among other things, a BIOS which may control basic hardware and/or software operation such as the interaction with peripheral components or devices.

Software 2430 may include code to implement aspects of the present disclosure, including code to support half-duplex operation in NR systems. Software 2430 may be stored in a non-transitory computer-readable medium such as system memory or other memory. In some cases, the software 2430 may not be directly executable by the processor but may cause a computer (e.g., when compiled and executed) to perform functions described herein.

Transceiver 2435 may communicate bi-directionally, via one or more antennas, wired, or wireless links as described above. For example, the transceiver 2435 may represent a wireless transceiver and may communicate bi-directionally with another wireless transceiver. The transceiver 2435 may also include a modem to modulate the packets and provide the modulated packets to the antennas for transmission, and to demodulate packets received from the antennas.

In some cases, the wireless device may include a single antenna 2440. However, in some cases the device may have more than one antenna 2440, which may be capable of concurrently transmitting or receiving multiple wireless transmissions.

Network communications manager 2445 may manage communications with the core network (e.g., via one or more wired backhaul links). For example, the network communications manager 2445 may manage the transfer of data communications for client devices, such as one or more UEs 115.

Inter-base station signaling manager 2450 may manage communications with other base station 105, and may include a controller or scheduler for controlling communications with UEs 115 in cooperation with other base stations 105. For example, the inter-base station signaling manager 2450 may coordinate scheduling for transmissions to UEs 115 for various interference mitigation techniques such as beamforming or joint transmission. In some examples, inter-base station signaling 2450 may provide an X2 interface within an LTE/LTE-A wireless communication network technology to provide communication between base stations 105.

Figure 25:
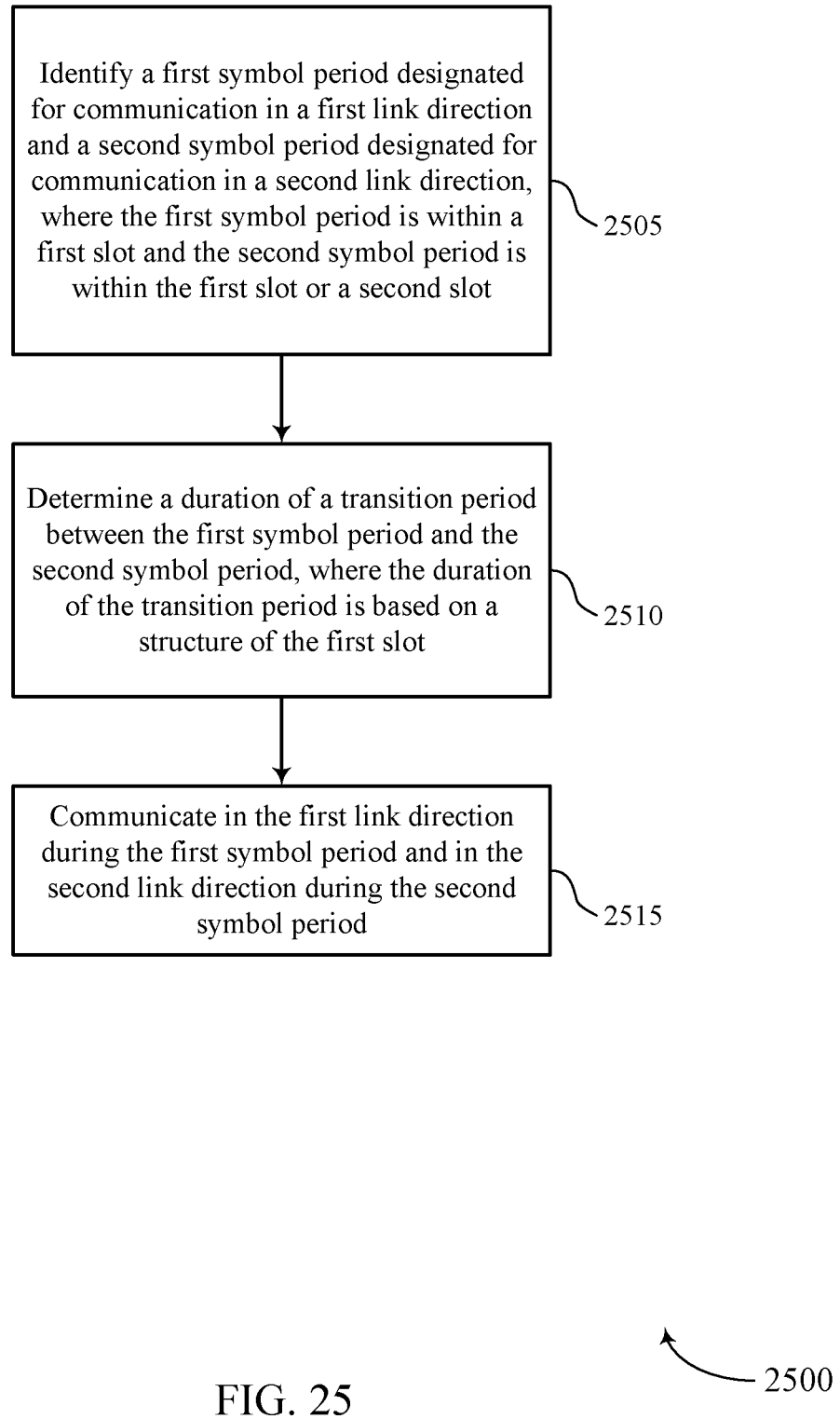
FIGS. 25-28 illustrate methods for half-duplex operation in NR systems in accordance with various aspects of the present disclosure.

FIG. 25 shows a flowchart illustrating a method 2500 for half-duplex operation in NR systems in accordance with various aspects of the present disclosure. The operations of method 2500 may be implemented by a UE 115 or its components as described herein. For example, the operations of method 2500 may be performed by a UE communication manager as described with reference to FIGS. 17 through 20. In some examples, the UE 115 may execute a set of codes to control the functional elements of the device to perform the functions described below. Additionally or alternatively, the UE 115 may perform aspects of the functions described below using special-purpose hardware.

At block 2505, the UE 115 may identify a first symbol period designated for communication in a first link direction and a second symbol period designated for communication in a second link direction, where the first symbol period is within a first slot and the second symbol period is within the first slot or a second slot. The operations of block 2505 may be performed according to the methods described with reference to FIGS. 1 through 12. In certain examples, aspects of the operations of block 2505 may be performed by a resource manager as described with reference to FIGS. 17 through 20.

At block 2510, the UE 115 may determine a duration of a transition period between the first symbol period and the second symbol period, where the duration of the transition period is based at least in part on a structure of the first slot. The operations of block 2510 may be performed according to the methods described with reference to FIGS. 1 through 12. In certain examples, aspects of the operations of block 2510 may be performed by a transition period manager as described with reference to FIGS. 17 through 20.

At block 2515, the UE 115 may communicate in the first link direction during the first symbol period and in the second link direction during the second symbol period. The operations of block 2515 may be performed according to the methods described with reference to FIGS. 1 through 12. In certain examples, aspects of the operations of block 2515 may be performed by a transmitter or receiver as described with reference to FIGS. 17 through 20.

Figure 26:
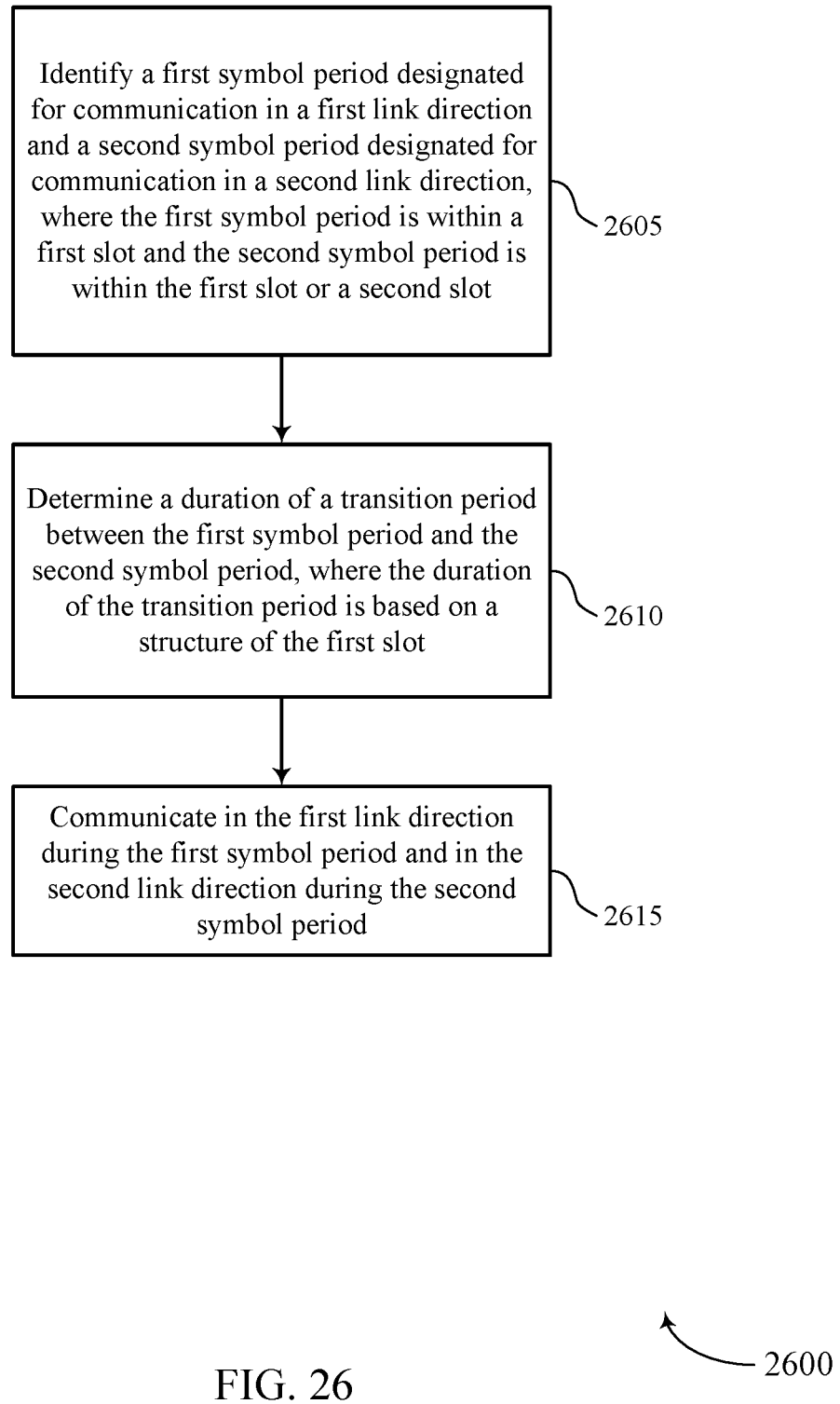

FIG. 26 shows a flowchart illustrating a method 2600 for half-duplex operation in NR systems in accordance with various aspects of the present disclosure. The operations of method 2600 may be implemented by a base station 105 or its components as described herein. For example, the operations of method 2600 may be performed by a base station communication manager as described with reference to FIGS. 21 through 24. In some examples, the base station 105 may execute a set of codes to control the functional elements of the device to perform the functions described below. Additionally or alternatively, the base station 105 may perform aspects of the functions described below using special-purpose hardware.

At block 2605, the base station 105 may identify a first symbol period designated for communication in a first link direction and a second symbol period designated for communication in a second link direction, where the first symbol period is within a first slot and the second symbol period is within the first slot or a second slot. The operations of block 2605 may be performed according to the methods described with reference to FIGS. 1 through 12. In certain examples, aspects of the operations of block 2605 may be performed by a resource manager as described with reference to FIGS. 21 through 24.

At block 2610, the base station 105 may determine a duration of a transition period between the first symbol period and the second symbol period, where the duration of the transition period is based at least in part on a structure of the first slot. The operations of block 2610 may be performed according to the methods described with reference to FIGS. 1 through 12. In certain examples, aspects of the operations of block 2610 may be performed by a transition period manager as described with reference to FIGS. 21 through 24.

At block 2615, the base station 105 may communicate in the first link direction during the first symbol period and in the second link direction during the second symbol period. The operations of block 2615 may be performed according to the methods described with reference to FIGS. 1 through 12. In certain examples, aspects of the operations of block 2615 may be performed by a transmitter or receiver as described with reference to FIGS. 21 through 24.

Figure 27:
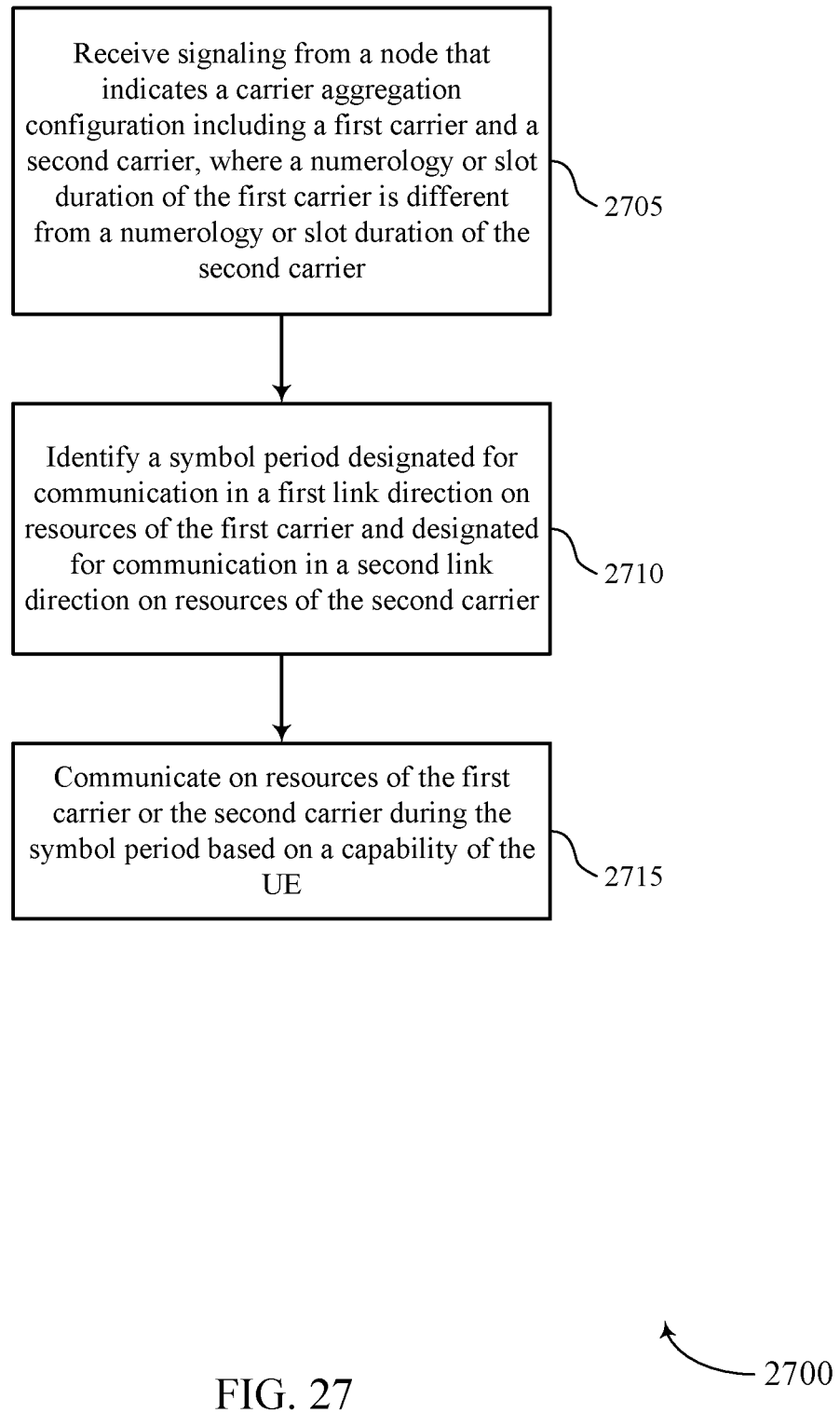

FIG. 27 shows a flowchart illustrating a method 2700 for half-duplex operation in NR systems in accordance with various aspects of the present disclosure. The operations of method 2700 may be implemented by a UE 115 or its components as described herein. For example, the operations of method 2700 may be performed by a UE communication manager as described with reference to FIGS. 17 through 20. In some examples, the UE 115 may execute a set of codes to control the functional elements of the device to perform the functions described below. Additionally or alternatively, the UE 115 may perform aspects of the functions described below using special-purpose hardware.

At block 2705, the UE 115 may receive signaling from a node that indicates a carrier aggregation configuration comprising a first carrier and a second carrier, where a numerology or slot duration of the first carrier is different from a numerology or slot duration of the second carrier. The operations of block 2705 may be performed according to the methods described with reference to FIGS. 1 through 12. In certain examples, aspects of the operations of block 2705 may be performed by a carrier aggregation manager as described with reference to FIGS. 17 through 20.

At block 2710, the UE 115 may identify a symbol period designated for communication in a first link direction on resources of the first carrier and designated for communication in a second link direction on resources of the second carrier. The operations of block 2710 may be performed according to the methods described with reference to FIGS. 1 through 12. In certain examples, aspects of the operations of block 2710 may be performed by a resource manager as described with reference to FIGS. 17 through 20.

At block 2715, the UE 115 may communicate on resources of the first carrier or the second carrier during the symbol period based at least in part on a capability of the UE 115. The operations of block 2715 may be performed according to the methods described with reference to FIGS. 1 through 12. In certain examples, aspects of the operations of block 2715 may be performed by a transmitter or receiver as described with reference to FIGS. 17 through 20.

Figure 28:
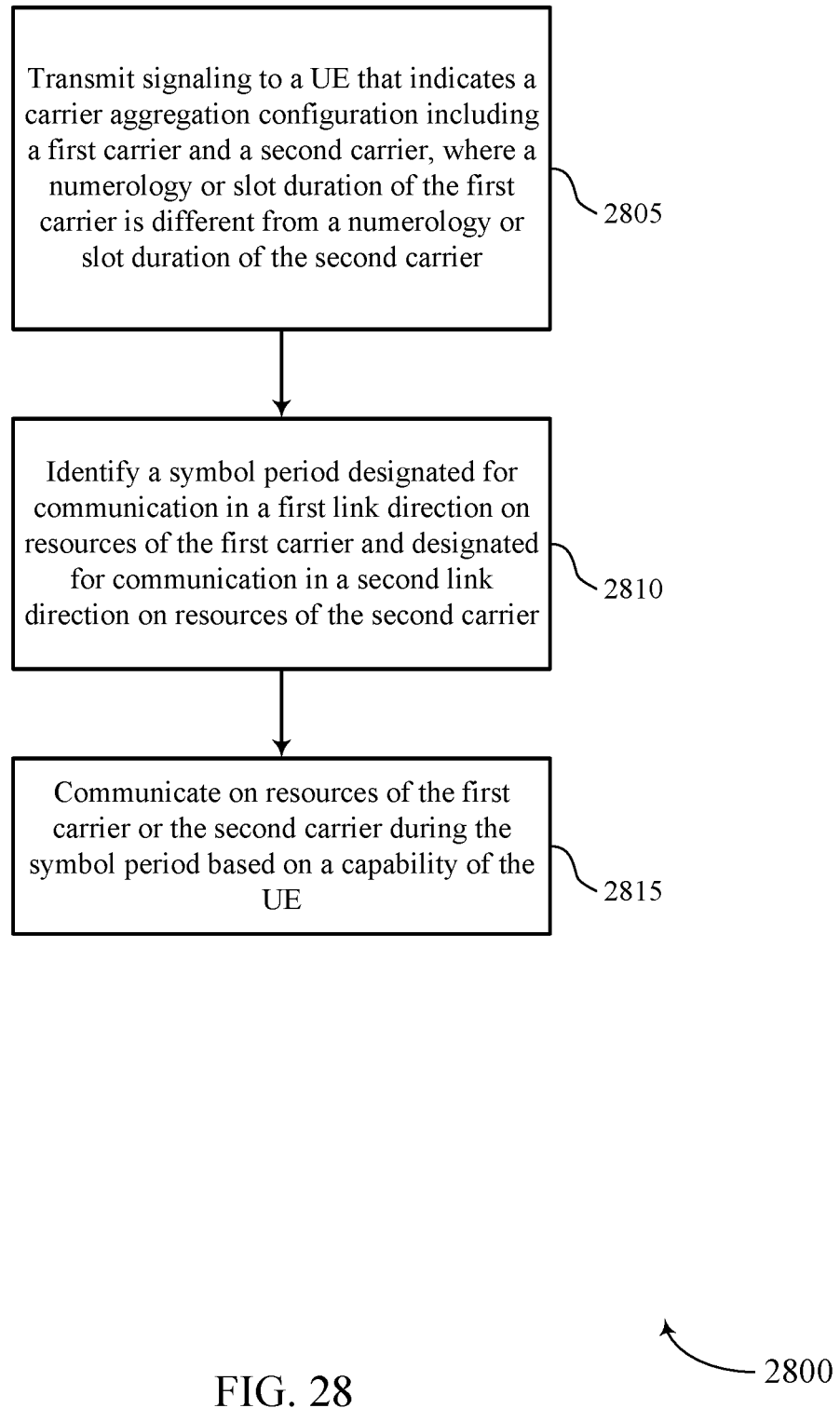

FIG. 28 shows a flowchart illustrating a method 2800 for half-duplex operation in NR systems in accordance with various aspects of the present disclosure. The operations of method 2800 may be implemented by a base station 105 or its components as described herein. For example, the operations of method 2800 may be performed by a base station communication manager as described with reference to FIGS. 21 through 24. In some examples, a base station 105 may execute a set of codes to control the functional elements of the device to perform the functions described below. Additionally or alternatively, the base station 105 may perform aspects of the functions described below using special-purpose hardware.

At block 2805, the base station 105 may transmit signaling to a UE 115 that indicates a carrier aggregation configuration comprising a first carrier and a second carrier, where a numerology or slot duration of the first carrier is different from a numerology or slot duration of the second carrier. The operations of block 2805 may be performed according to the methods described with reference to FIGS. 1 through 12. In certain examples, aspects of the operations of block 2805 may be performed by a carrier aggregation manager as described with reference to FIGS. 21 through 24.

At block 2810, the base station 105 may identify a symbol period designated for communication in a first link direction on resources of the first carrier and designated for communication in a second link direction on resources of the second carrier. The operations of block 2810 may be performed according to the methods described with reference to FIGS. 1 through 12. In certain examples, aspects of the operations of block 2810 may be performed by a resource manager as described with reference to FIGS. 21 through 24.

At block 2815, the base station 105 may communicate on resources of the first carrier or the second carrier during the symbol period based at least in part on a capability of the UE 115. The operations of block 2815 may be performed according to the methods described with reference to FIGS. 1 through 12. In certain examples, aspects of the operations of block 2815 may be performed by a transmitter or receiver as described with reference to FIGS. 21 through 24.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB) or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a base station, signaling that indicates a carrier aggregation configuration comprising a first carrier and a second carrier, wherein a numerology or symbol duration within a first slot of the first carrier is different from a numerology or symbol duration within a second slot of the second carrier;
    identifying a symbol period designated for simultaneous communications in a first link direction on resources of the first carrier and in a second link direction on resources of the second carrier; and
    communicating on resources of the first carrier or the second carrier during the symbol period based at least in part on a capability of the UE.

2. The method of claim 1, wherein the first link direction comprises one of a downlink, an uplink, or a sidelink, and the second link direction comprises one of a downlink, an uplink or a sidelink, and is different from the first link direction.

3. The method of claim 1, wherein the capability of the UE comprises a capability of the UE to communicate in a half-duplex operating mode, and wherein communicating on resources of the first carrier or the second carrier during the symbol period comprises:
    communicating on resources of the first carrier or the second carrier during the symbol period based at least in part on the capability of the UE to communicate in the half-duplex operating mode.

4. The method of claim 1, further comprising:
    refraining from communicating on resources of the first carrier or the second carrier during the symbol period.

5. The method of claim 1, wherein communicating on resources of the first carrier or the second carrier during the symbol period comprises:
    communicating on resources of the first carrier or the second carrier during the symbol period based at least in part on a cell identity of the first carrier or the second carrier.

6. The method of claim 5, wherein the cell identity indicates at least one of a primary cell (PCell), primary secondary cell (PSCell), or a secondary cell (SCell).

7. The method of claim 1, wherein communicating on resources of the first carrier or the second carrier during the symbol period comprises:
    communicating on resources of the first carrier or the second carrier during the symbol period based at least in part on a configuration of at least one of the first carrier and the second carrier.

8. The method of claim 1, wherein the simultaneous communications in the first link direction on resources of the first carrier and in the second link direction on resources of the second carrier are within a same frequency band.

9. The method of claim 1, wherein communicating on resources of the first carrier or the second carrier during the symbol period is based at least in part on the numerology or symbol duration of the first carrier and the second carrier.

10. The method of claim 1, wherein the capability of the UE comprises an inability to support both of the simultaneous communications in the first link direction and in the second link direction.

11. A method for wireless communication at a base station, comprising:
    transmitting, to a user equipment (UE), signaling that indicates a carrier aggregation configuration comprising a first carrier and a second carrier, wherein a numerology or symbol duration within a first slot of the first carrier is different from a numerology or symbol duration within a second slot of the second carrier;
    determining a capability of the UE to communicate on the first carrier and the second carrier;
    identifying a symbol period designated for simultaneous communications in a first link direction on resources of the first carrier and in a second link direction on resources of the second carrier; and
    communicating on resources of the first carrier or the second carrier during the symbol period based at least in part on the capability.

12. The method of claim 11, wherein the first link direction comprises one of a downlink, an uplink, or a sidelink, and the second link direction comprises one of a downlink, an uplink or a sidelink, and is different from the first link direction.

13. The method of claim 11, wherein the capability of the UE comprises a capability of the UE to communicate in a half-duplex operating mode, and wherein receiving communications from the UE on resources of the first carrier or the second carrier during the symbol period comprises:
    communicating on resources of the first carrier or the second carrier during the symbol period based at least in part on the capability of the UE to communicate in the half-duplex operating mode.

14. The method of claim 11, further comprising:
    transmitting, to the UE, an indication to refrain from communicating on resources of the first carrier or the second carrier during the symbol period.

15. The method of claim 11, wherein communicating on resources of the first carrier or the second carrier during the symbol period comprises:

communicating on resources of the first carrier or the second carrier during the symbol period based at least in part on a cell identity of the first carrier or the second carrier.

16. The method of claim 15, wherein the cell identity indicates at least one of a primary cell (PCell), primary secondary cell (PSCell), or a secondary cell (SCell).

17. The method of claim 11, wherein the simultaneous communications in the first link direction on resources of the first carrier and in the second link direction on resources of the second carrier are within a same frequency band.

18. The method of claim 11, wherein communicating on resources of the first carrier or the second carrier during the symbol period is based at least in part on the numerology or symbol duration of the first carrier and the second carrier.

19. The method of claim 11, wherein the capability of the UE comprises an inability to support both of the simultaneous communications in the first link direction and in the second link direction.

20. An apparatus for wireless communication at a user equipment (UE), comprising:
a processor;
memory coupled with the processor; and
instructions stored in the memory and operable, when executed by the processor, to cause the apparatus to:
receive, from a base station, signaling that indicates a carrier aggregation configuration comprising a first carrier and a second carrier, wherein a numerology or symbol duration within a first slot of the first carrier is different from a numerology or symbol duration within a second slot of the second carrier;
identify a symbol period designated for simultaneous communications in a first link direction on resources of the first carrier and in a second link direction on resources of the second carrier; and
communicate on resources of the first carrier or the second carrier during the symbol period based at least in part on a capability of the UE.

21. The apparatus of claim 20, wherein the first link direction comprises one of a downlink, an uplink, or a sidelink, and the second link direction comprises one of a downlink, an uplink or a sidelink, and is different from the first link direction.

22. The apparatus of claim 20, wherein the capability of the UE comprises a capability of the UE to communicate in a half-duplex operating mode, and wherein the instructions are further executable by the processor to:
communicate on resources of the first carrier or the second carrier during the symbol period based at least in part on the capability of the UE to communicate in the half-duplex operating mode.

23. The apparatus of claim 20, wherein the instructions are further executable by the processor to:
refrain from communicating on resources of the first carrier or the second carrier during the symbol period.

24. The apparatus of claim 20, wherein the instructions are further executable by the processor to:
communicate on resources of the first carrier or the second carrier during the symbol period based at least in part on a cell identity of the first carrier or the second carrier, wherein the cell identity indicates at least one of a primary cell (PCell), primary secondary cell (PSCell), or a secondary cell (SCell).

25. The apparatus of claim 20, wherein the instructions are further executable by the processor to:
communicate on resources of the first carrier or the second carrier during the symbol period based at least in part on a configuration of at least one of the first carrier and the second carrier.

26. An apparatus for wireless communication at a base station, comprising:
a processor;
memory coupled with the processor; and
instructions stored in the memory and operable, when executed by the processor, to cause the apparatus to:
transmit, to a user equipment (UE), signaling that indicates a carrier aggregation configuration comprising a first cell and a second cell, wherein a numerology or symbol duration within a first slot of the first cell is different from a numerology or symbol duration within a second slot of the second cell;
determine a capability of the UE to communicate on the first carrier and the second carrier;
identify a symbol period designated for simultaneous communications in a first link direction on resources of the first cell and in a second link direction on resources of the second cell; and
communicate on resources of the first cell or the second cell during the symbol period based at least in part on the capability.

27. The apparatus of claim 26, wherein the first link direction comprises one of a downlink, an uplink, or a sidelink, and the second link direction comprises one of a downlink, an uplink or a sidelink, and is different from the first link direction.

28. The apparatus of claim 26, wherein the capability of the UE comprises a capability of the UE to communicate in a half-duplex operating mode, and wherein the instructions are further executable by the processor to:
communicate on resources of the first cell or the second cell during the symbol period based at least in part on the capability of the UE to communicate in the half-duplex operating mode.

29. The apparatus of claim 26, wherein the instructions are further executable by the processor to:
transmit, to the UE, an indication to refrain from communicating on resources of the first cell or the second cell during the symbol period.

30. The apparatus of claim 26, wherein the instructions are further executable by the processor to:
communicate on resources of the first cell or the second cell during the symbol period based at least in part on a cell identity of the first cell or the second cell, wherein the cell identity indicates at least one of a primary cell (PCell), primary secondary cell (PSCell), or a secondary cell (SCell).

* * * * *